(12) United States Patent
McMurtrey et al.

(10) Patent No.: US 9,815,486 B2
(45) Date of Patent: Nov. 14, 2017

(54) SHOPPING CART BUMPER

(71) Applicant: Unarco Industries LLC, Wagoner, OK (US)

(72) Inventors: Wesley McMurtrey, Wagoner, OK (US); Charlie Wagner, Coweta, OK (US)

(73) Assignee: Unarco Industries LLC, Wagoner, OK (US)

( * ) Notice: Subject to any disclaimer, the term of this patent is extended or adjusted under 35 U.S.C. 154(b) by 0 days.

(21) Appl. No.: 15/367,451

(22) Filed: Dec. 2, 2016

(65) Prior Publication Data

US 2017/0080966 A1   Mar. 23, 2017

Related U.S. Application Data

(60) Continuation-in-part of application No. 15/255,360, filed on Sep. 2, 2016, which is a division of application No. 14/478,478, filed on Sep. 5, 2014, now Pat. No. 9,457,827, and a continuation-in-part of application No. 14/098,744, filed on Dec. 6, 2013, now abandoned.

(60) Provisional application No. 62/037,690, filed on Aug. 15, 2014, provisional application No. 62/263,366, filed on Dec. 4, 2015, provisional application No. 61/734,275, filed on Dec. 6, 2012.

(51) Int. Cl.
| | |
|---|---|
| *B62B 3/02* | (2006.01) |
| *B62B 5/00* | (2006.01) |
| *B62B 3/14* | (2006.01) |
| *B62B 5/06* | (2006.01) |
| *B62B 5/08* | (2006.01) |
| *B62B 3/00* | (2006.01) |

(52) U.S. Cl.
CPC ............ *B62B 5/0006* (2013.01); *B62B 3/005* (2013.01); *B62B 3/02* (2013.01); *B62B 3/14* (2013.01); *B62B 3/1444* (2013.01); *B62B 3/1496* (2013.01); *B62B 5/06* (2013.01); *B62B 5/082* (2013.01); *B62B 2501/00* (2013.01); *B62B 2501/04* (2013.01); *B62B 2501/067* (2013.01)

(58) Field of Classification Search
CPC .. B62B 5/00; B62B 5/006; B62B 3/14; B62B 3/027; B62B 5/06; B62B 5/082; B62B 3/005; B62B 3/02; B62B 3/1444; B62B 3/1496
USPC ........................................ 280/33.991, 33.992
See application file for complete search history.

(56) References Cited

U.S. PATENT DOCUMENTS

| | | | | |
|---|---|---|---|---|
| 2,825,481 | A * | 3/1958 | Glenny .................... | B65D 7/20 140/71 R |
| 5,131,669 | A * | 7/1992 | Kinnamon ............ | B62B 5/0006 280/33.992 |
| 7,121,562 | B2 * | 10/2006 | O'Quin ................. | B62B 5/0006 248/345.1 |
| 2010/0066043 | A1 * | 3/2010 | Tyrrell .................... | B62B 3/102 280/33.992 |

FOREIGN PATENT DOCUMENTS

FR          2925449 A1 *   6/2009   ........... B62B 5/0006

\* cited by examiner

*Primary Examiner* — John Walters
(74) *Attorney, Agent, or Firm* — Banner & Witcoff, Ltd.

(57) ABSTRACT

A shopping cart bumper in one embodiment comprises a U-shaped bumper having a plurality of slots on an inner leg of the bumper for engaging wires of a shopping cart.

14 Claims, 25 Drawing Sheets

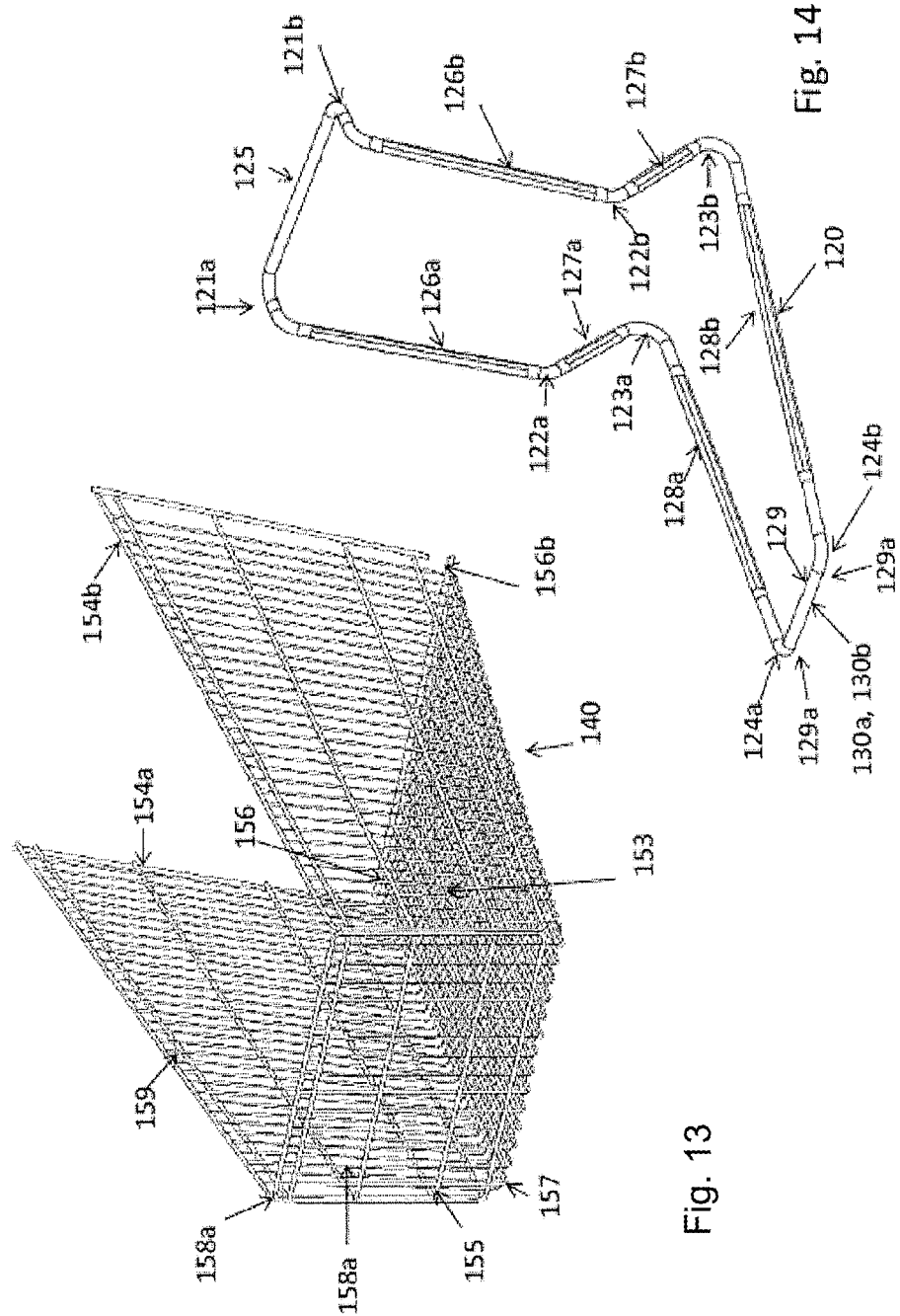

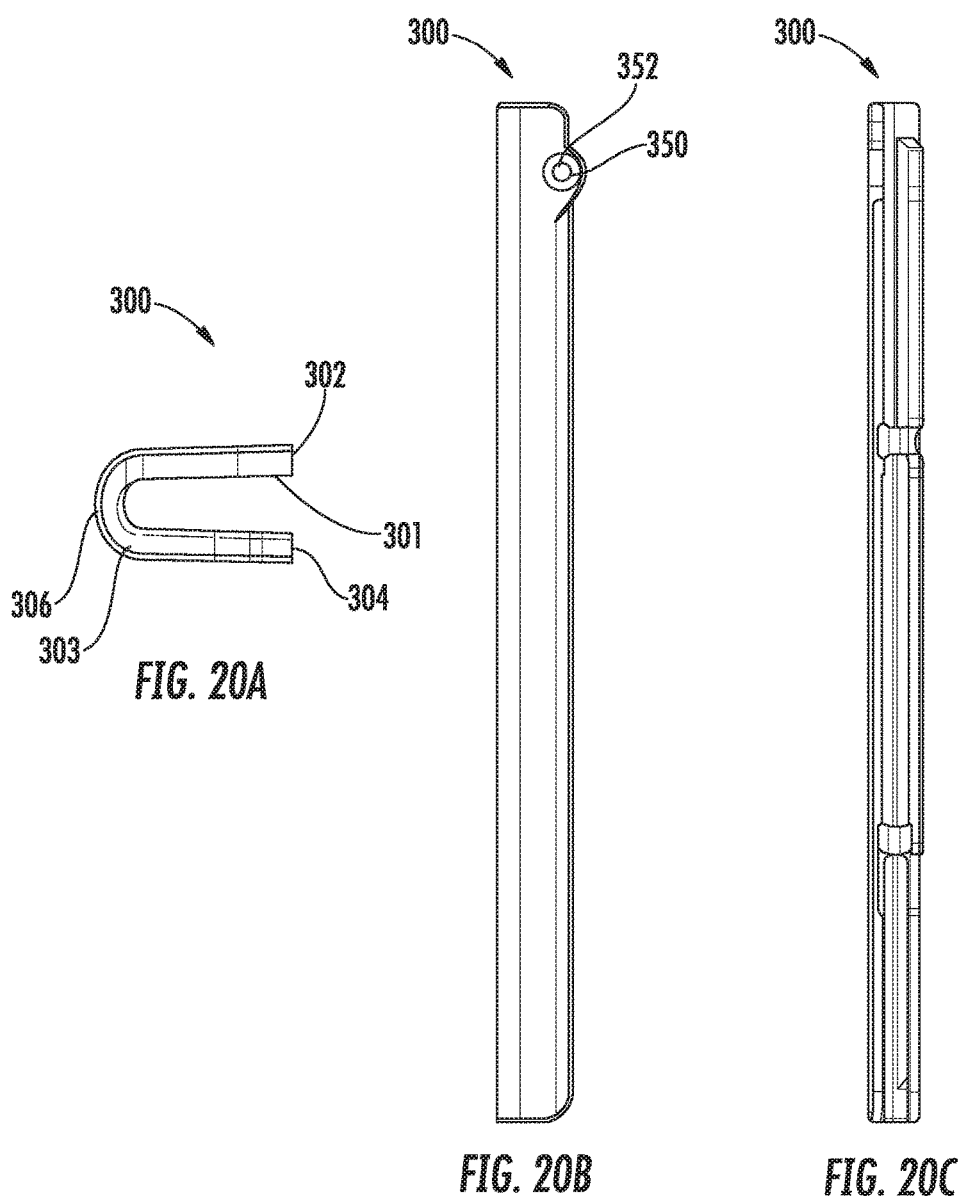

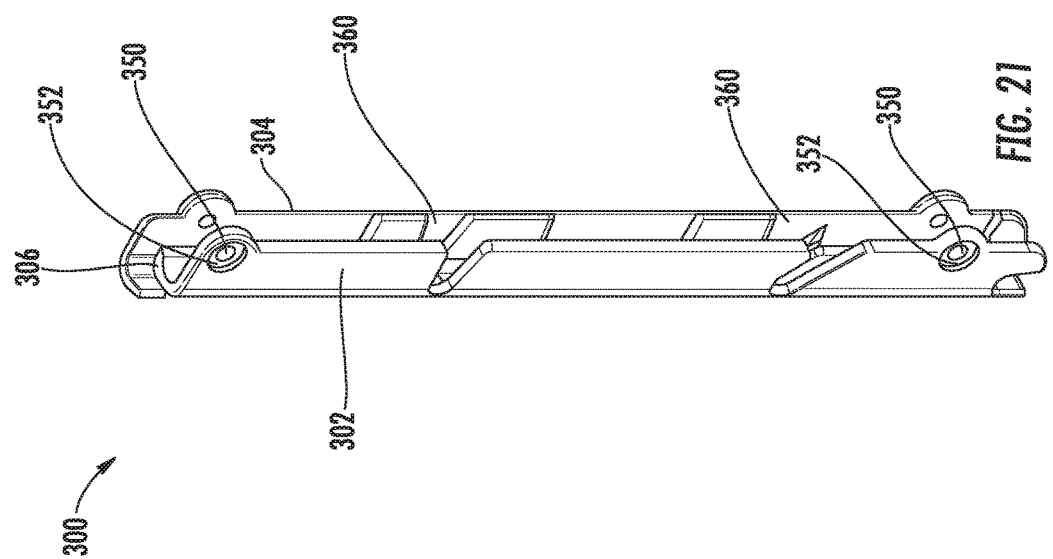
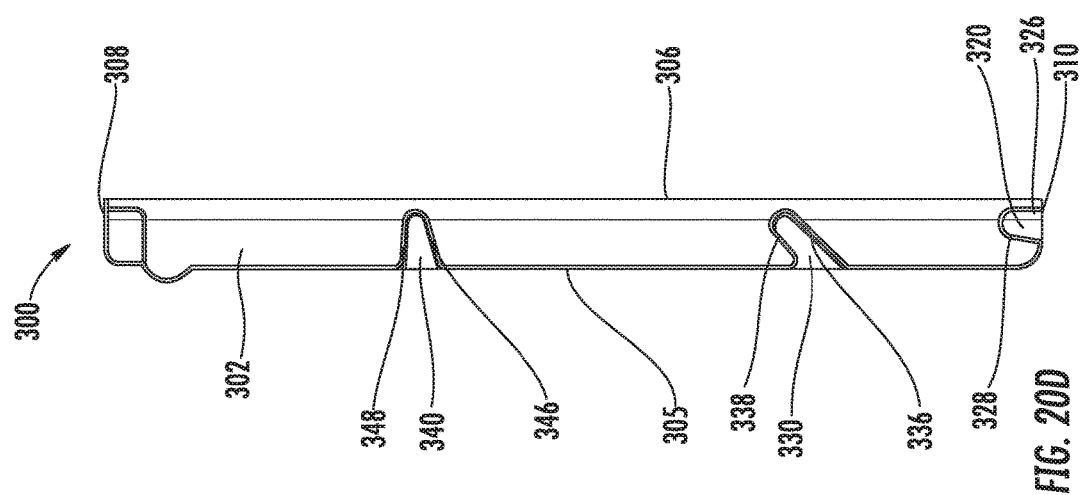

SHOPPING CART BUMPER

CROSS-REFERENCE TO RELATED APPLICATIONS

This patent application claims the benefit U.S. Provisional Patent Application No. 62/263,366, filed Dec. 4, 2015, entitled Shopping Cart Bumper. This application is also a continuation-in-part-application of U.S. patent application Ser. No. 15/255,360 filed Sep. 2, 2016 entitled Shopping Cart Basket and Method of Manufacture, which is a divisional application of U.S. patent application Ser. No. 14/478,478 filed Sep. 5, 2014 (now U.S. Pat. No. 9,457,827), which is a non-provisional application of U.S. Provisional Application No. 62/037,690 filed Aug. 15, 2014. U.S. patent application Ser. No. 15/255,360 is also a continuation-in-part application of U.S. patent application Ser. No. 14/098,744 filed Dec. 6, 2014, which is a non-provisional application of U.S. Provisional Application No. 61/734,275. The disclosures of each of the above noted applications are hereby incorporated by reference in their entirety.

FIELD OF THE INVENTION

This disclosure relates to bumpers for wire-made shopping carts for grocery stores and the like and shopping carts including bumpers.

BACKGROUND

History and lore teach that the shopping cart was invented by Oklahoman Sylvan Goldman, for his grocery store business, the one that became over time Unarco Industries, LLC, the assignee of this disclosure.

At present, the American-market, adult, full-size, wire-made shopping cart has a distinctive construction of a frame, casters, basket, hinged back gate and child seat.

The frame is composed of a chassis and a handle, made up of multiple, bent steel tubes, and sits atop four casters, the rear two of which track forward and back, and the front two of which swivel. A lower shelf of wire lies between the lower side rails of the chassis. The frame handle rises in the back from the chassis to form the "driver's" "steering mechanism." The basket is see-through, made of wires, and mounts atop the frame, forward of the handle. A hinged back gate with a folding child seat completes the basket and allows the carts to nest with each other in the manner familiar to all shoppers in stores with carts.

In more detail as to the basket, horizontal wires of the basket extend fully from one upper side rail, alongside the handle, around the side of the cart, across its front, back around its other side, and to the opposite upper side rail, on the other side of the handle. A second set of wires extend from a top wire of the first set, down a side of the basket, across the basket floor, and up the other side. A third set of wires also extend from a top wire of the first set, down the front of the basket, and across the floor to the last wire of the second set. As a result, the sides, front and bottom of the cart all have the structure of two groups of wires from among the three sets, crossing at right angles and forming a mesh.

While ubiquitous and iconic, these carts are not without their issues. Some lesser brands wear poorly, show rust, dent and break readily, are expensive to ship, are difficult to separate when nested, and represent assembly processes that have existed for ages with little change.

For more historical information, see the following: Unarco Company History, Unarco Industries LLC, currently found at http://www.unarco.com/history.html; and for more allegedly historically accurate information, Shopping Cart, currently found at http://en.wikipedia.org/wiki/Shopping-_cart; Smithsonian's History Explorer, History of the Shopping Cart, currently found at http://amhistory.si.edu/thinkfinity/podcast/shoppingcart.m4a. See as well the following patents and patent publications: U.S. Pat. No. 2,155,896, inventor Sylvan Goldman (original shopping cart); U.S. Pat. No. 2,662,775, inventor same; and U.S. Pat. No. 2,769,645, inventor same (folding child seat with hinged back gate). For more current information, see U.S. Pat. No. 7,090,230 issued Aug. 15, 2006, inventor O'Quin, assignee Unarco; U.S. Patent Publication No. US 2014/0159327 published Jun. 12, 2014, on a Shopping Cart, inventors Smith and McMurtrey, assignee Unarco, especially at FIGS. 2-3; U.S. Patent Publication No. US 2013/0307239 published Nov. 21, 2013, on a Shopping Cart and Method of Assembling Same, inventors Smith and McMurtrey, assignee Unarco, especially at its background; and "Manufacturing Shopping Trolleys," https://www.youtube.com/watch?v=u5hwY1s0O0M, uploaded according to YouTube Apr. 12, 2008.

The following pending patent applications are incorporated by reference in full as if fully set forth in this disclosure: U.S. application Ser. No. 14/098,744, filed Dec. 6, 2013, inventors Smith and McMurtrey, assignee Unarco, also known as U.S. Patent Publication No. US 2014/0159327 published Jun. 12, 2014.

SUMMARY

A shopping cart bumper in one embodiment comprises a U-shaped bumper having a plurality of slots on an inner leg of the bumper for engaging wires of a shopping cart.

BRIEF DESCRIPTION OF THE DRAWINGS

FIG. 13 is a perspective view similar to FIGS. 4 and 6, of a second embodiment.

FIG. 14 is a perspective view of a preferred frame of the embodiments.

FIGS. 20A-20D are views of a shopping cart bumper according to aspects of this disclosure.

FIG. 21 is a perspective view of a shopping cart bumper according to aspects of this disclosure.

DETAILED DESCRIPTION OF EMBODIMENTS

Figure 11:
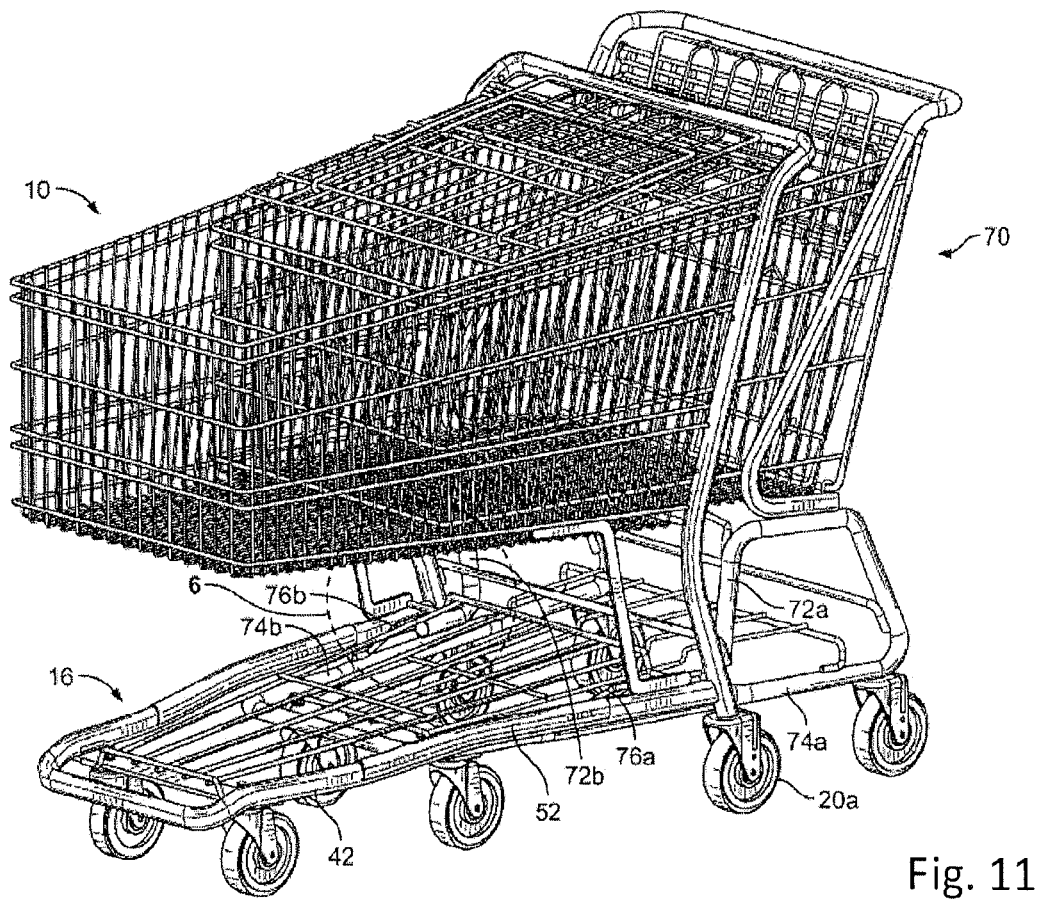
FIG. 11 is a reproduction of FIG. 5 of U.S. Patent Publication No. 2014/0159327.

Referring to FIG. 11, two existing embodiments of American-market, full-size, adult, wire-made shopping carts include a first cart 10 and a second cart 70. Cart 10 has a frame 16 with a first tier portion 42, a cover 52 on an inclined portion, casters, e.g., 20a, and a variety of other structures including a basket as described in the Background. Cart 70 includes frame members, e.g., 72a, 72b, 74a, 74b, caster lift wires 76a, 76b, and other structures, including the same basket. Frame member 72a is representative of two upright forward side frame members, the second one of which is not numbered. Frame member 72a is also representative of two additional upright side frame members, the upright rearward side frame members, above the rear casters and below the basket. Note also that the frames of both carts 10, 70 are formed of multiple bent tubes.

As shown in U.S. Pat. No. 7,090,230, issued Aug. 15, 2006, inventor O'Quin, assignee Unarco, carts such as cart 70 have been known in the past to include horizontal side rail frame sections that include cross-sections as in the patent's FIGS. 2 and 3 that increase strength.

As shown in "Manufacturing Shopping Trolleys," referenced above, at least one existing embodiment of carts called trolleys in European countries appear to have been made by processes that form rudimentary mats of floor portions of carts with outwardly dangling and outwardly disconnected fringe wires.

Figure 1:
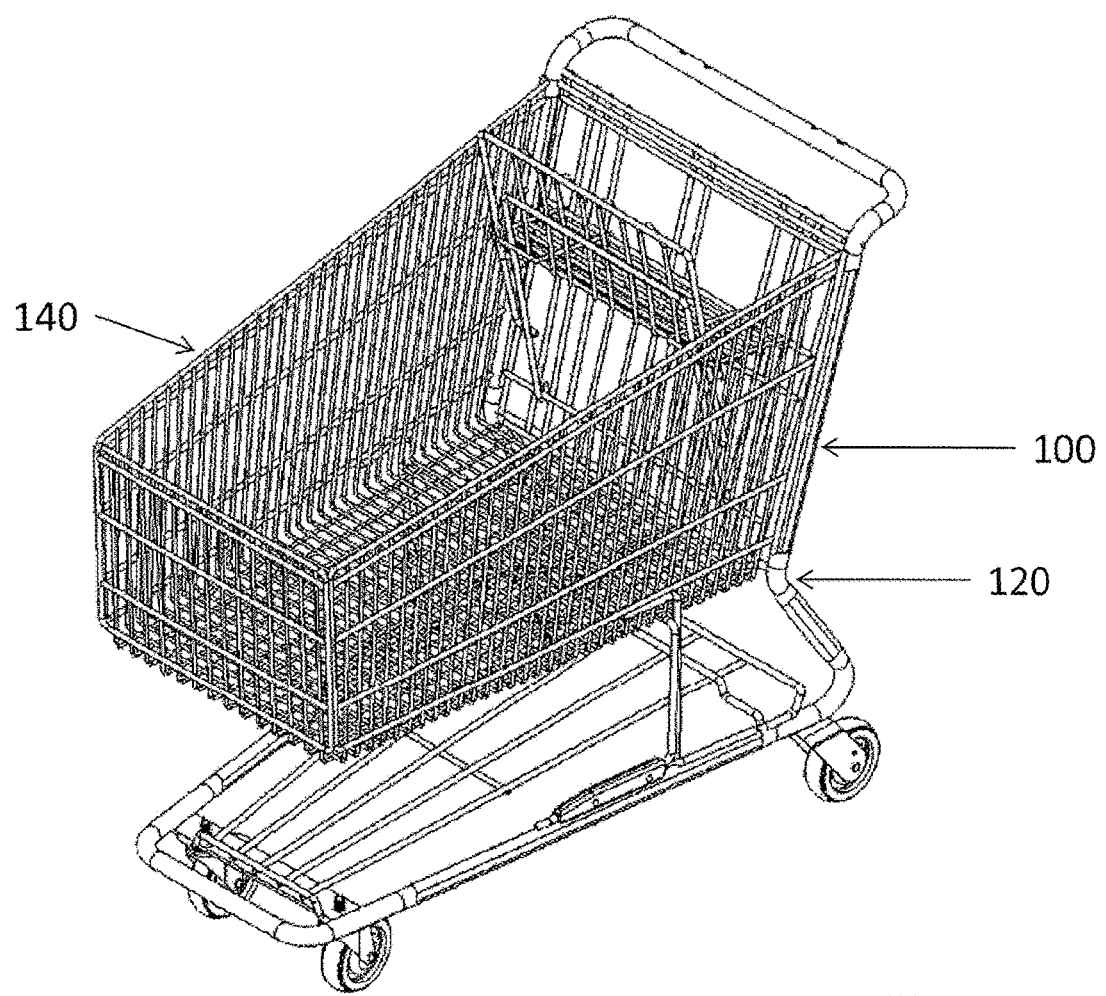
FIG. 1 is a perspective view of a shopping cart featuring an embodiment of the present invention.
Figure 9:
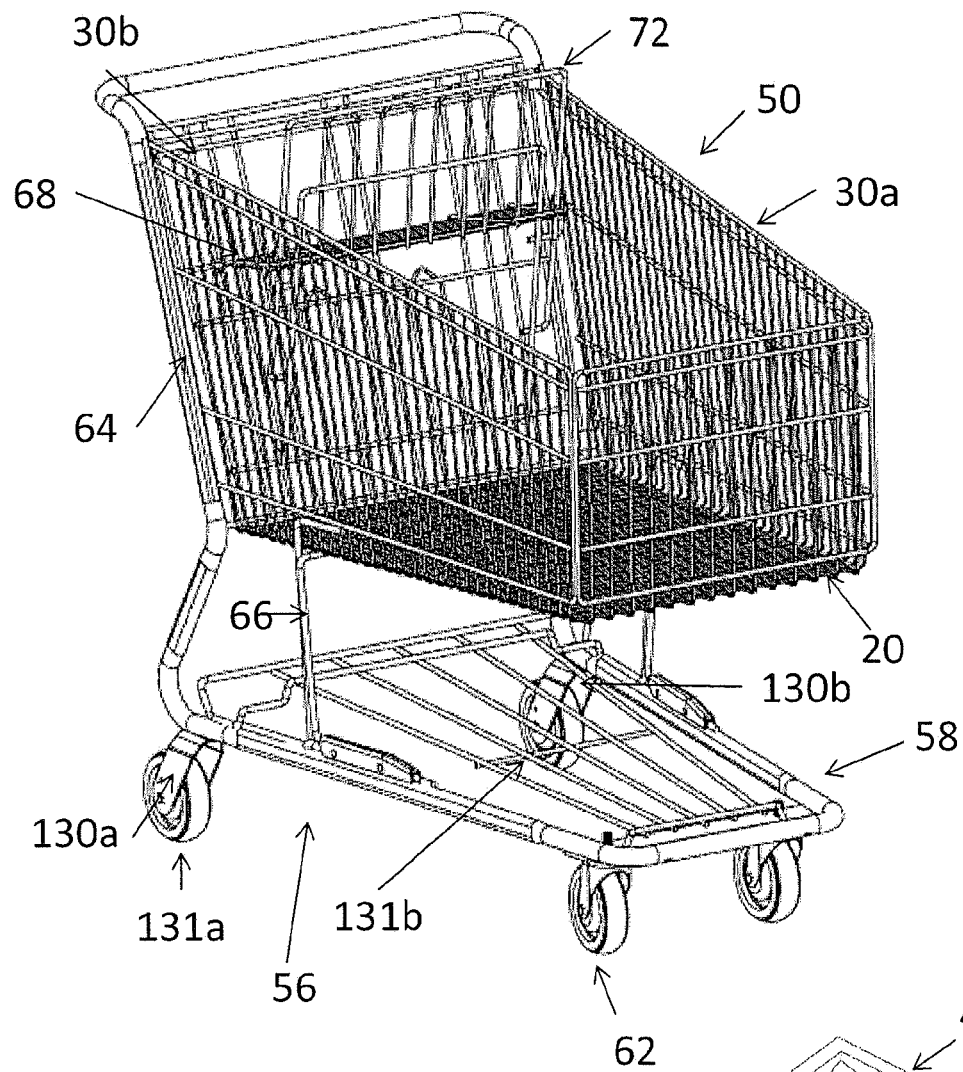
FIG. 9 is a perspective view similar to FIG. 1 of the embodiment of FIGS. 2-8.
Figure 10:
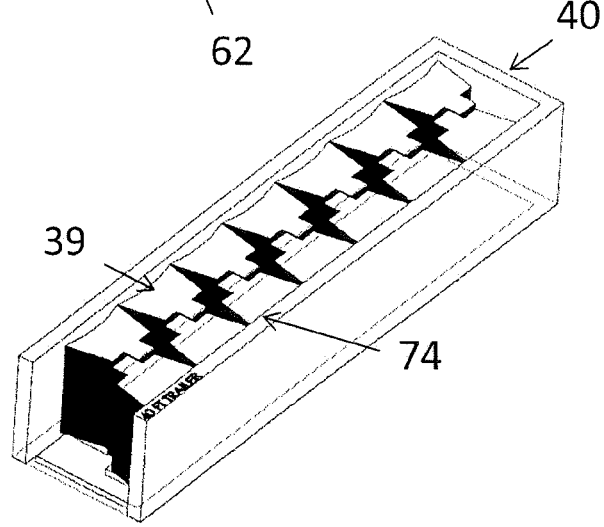
FIG. 10 is an illustration of completed wire mats and nose panels used to construct an embodiment of the shopping cart basket of the present invention loaded into and stacked within a 40 foot shipping container.

In accordance with embodiments of the shopping carts, shopping cart baskets, and manufacturing methods of the present invention, see FIGS. 1 and 9, and unlike other baskets, see again FIG. 11, it is possible to have at least a majority of the basket wire welding procedures performed while the basket is still in a generally flat, mat or blank state. Most preferably, the basket is created, exists and remains in the mat or blank state until arrival at a modern assembly plant where it is quickly and easily formed and finish welded to create a basket. Again most preferably, as in the embodiment primarily of FIG. 12, the basket is formed as a unimat, such that the forming is by bending along very few lines, such as three lines, and three lines only, and the finish welding is along very few lines, such as few as two. This method allows for a variety of benefits including shipment of a great number of units of baskets, in the mat form or state, in shipping containers, as in FIG. 10, and a significantly greater number than the designs of, for example, FIG. 11. Still most preferably, the basket in the mat or blank state having been substantially completely finished, to the state in which only as few bend lines as three and as few weld lines as two are required, the benefits include minimal post-mat creation manufacturing steps, and a significantly fewer number than the design of, for example, "Manufacturing Shopping Trolleys."

Figure 2:
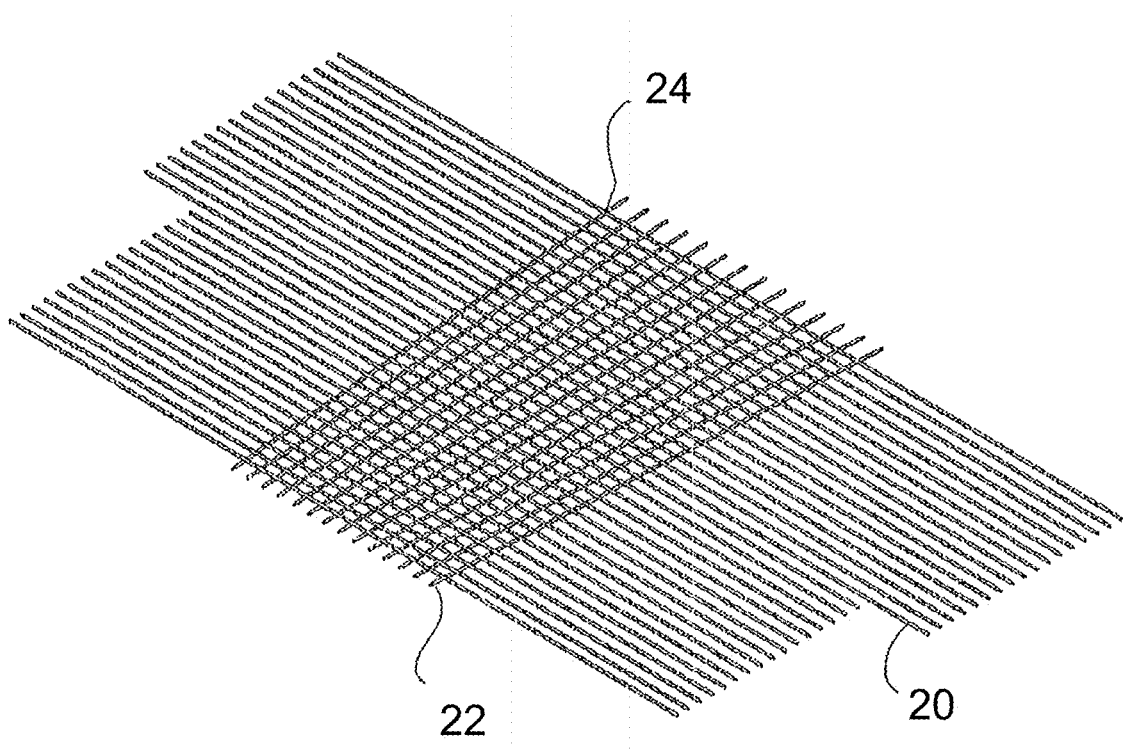
FIG. 2 is a perspective view of a wire mat formed during manufacture of an embodiment of a shopping cart basket of the present invention in accordance with an embodiment of the manufacturing method of the present invention.

More specifically, as illustrated in FIG. 2, in one embodiment (note, the embodiment of FIGS. 2-10, not the embodiment of FIGS. 1 and 12-16), from a beginning of manufacture to an intermediate stage of manufacture, a number of transverse wires 20 are joined to a number of longitudinal wires 22 to form a one-piece mat or blank where the intersections of the transverse and longitudinal wires form the basket floor portion 24. The terms "mat" and "blank" are used for structures the major components of which lie in a common, single, plane, typically a flat plane. (Minor deviations from a flat plane are included in the concept of a flat plane.) The term "longitudinal wires" is used for wires that are perfectly longitudinal as well as those wires that deviate from perfectly longitudinal, to provide a shopping cart basket floor with its isosceles trapezoidal (trapeziform) shape, as shown in FIG. 2. The transverse and longitudinal wires are preferably formed from steel or another metal and are joined by resistance welding. Other wire materials and joining methods known in the art may alternatively be used. In addition, the number of longitudinal wires and the number of transverse wires may deviate from the number shown.

Figure 3A:
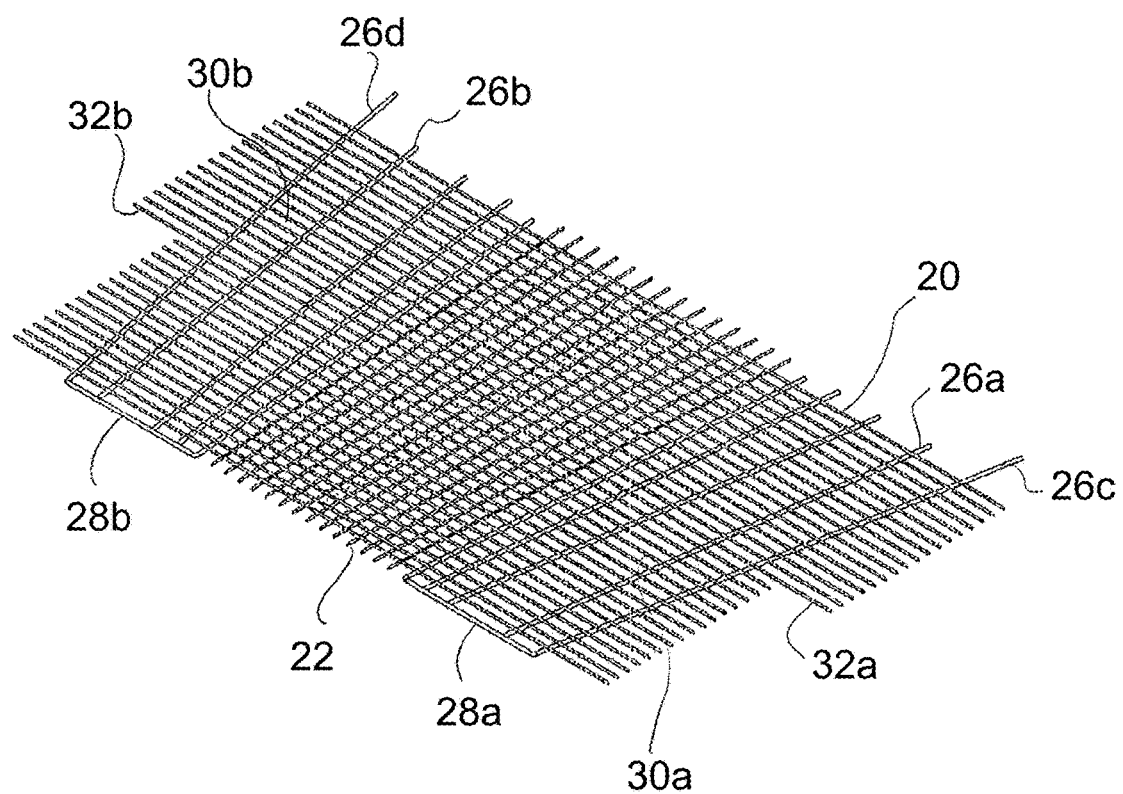
FIG. 3A is a perspective view of the wire mat of FIG. 2 with side wall structural wires added.

With reference to FIG. 3a, in an intermediate stage, a number of side wall structural wires 26a and 26b are resistance welded to transverse wires 20. The side wall structural wires preferably are also formed from steel or another metal and feature diameters larger than the diameters of transverse and longitudinal wires 22 and 20. The leading ends of the structural wires 26a and 26b are attached to side wall leading end support wires 28a and 28b, such as by resistance welding. Of course other materials and joining methods known in the art may be used. As a result, basket side wall portions 30a and 30b are formed.

Figure 3B:
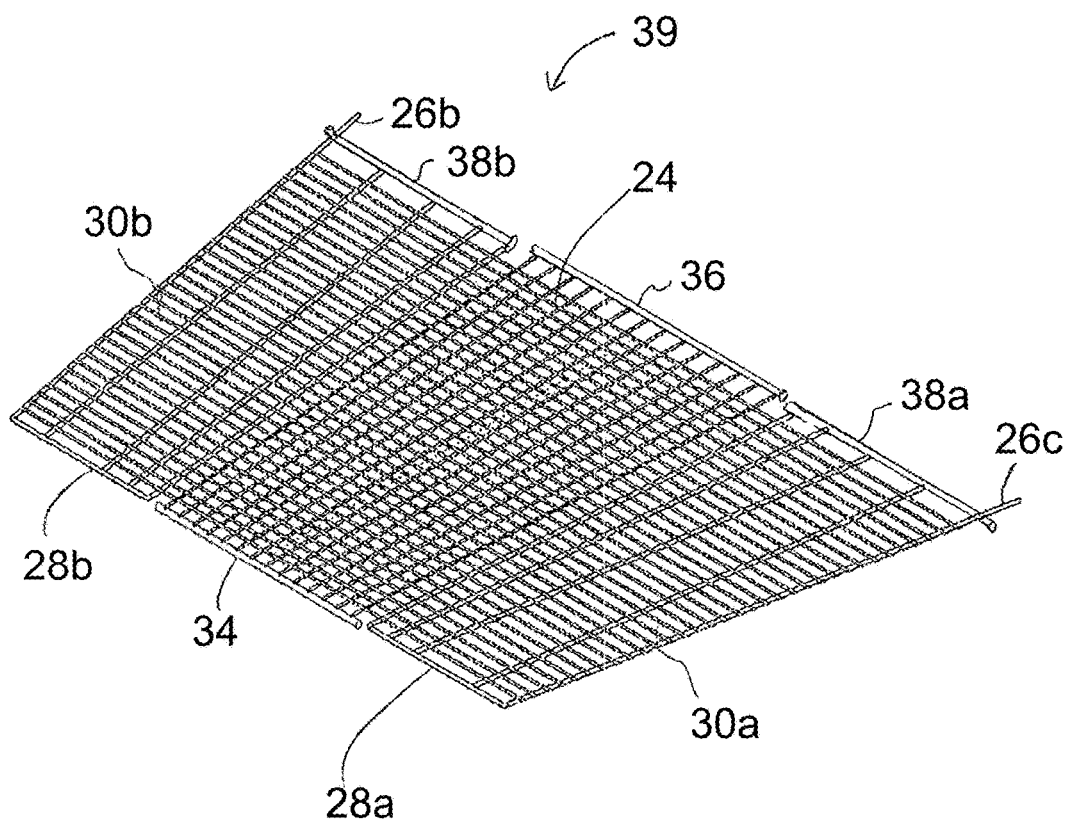
FIG. 3B is a perspective view of the completed wire mat.

The end portions 32a and 32b of the transverse wires that extend beyond the outer or top side wall structural wires 26c and 26d are next cut away and discarded, as illustrated in FIG. 3b.

Figure 4:
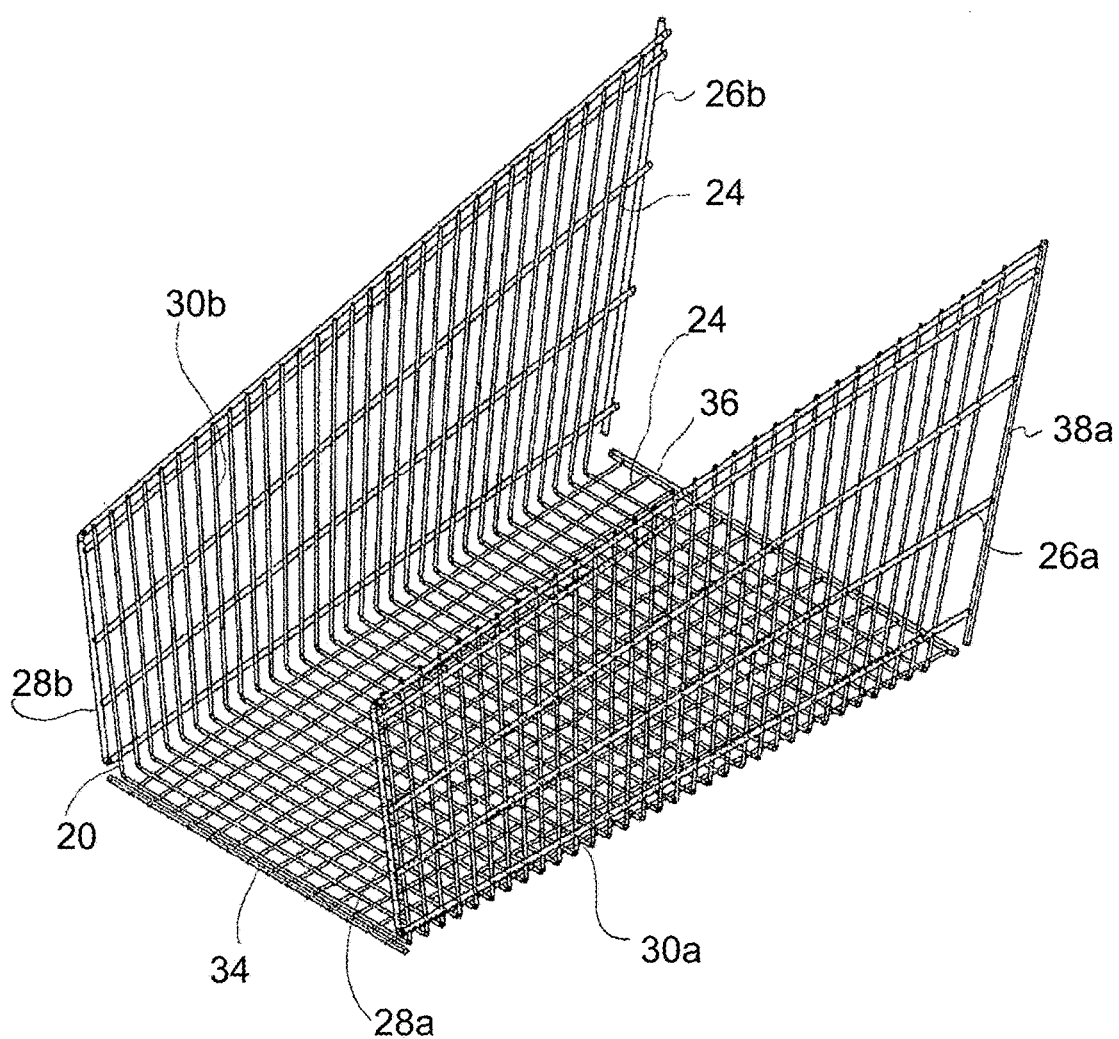
FIG. 4 is a perspective view of the wire mat of FIG. 3b with the basket side walls formed by folding side wall portions of the wire mat upward.

As illustrated in FIGS. 3b and 4, leading and trailing end floor wires 34 and 36, respectively, are attached to the leading and trailing ends of the longitudinal wires making up the basket floor 24, such as by resistance welding or other attachment method. In addition, side wall trailing end support wires 38a and 38b are attached to the trailing ends of the side wall structural wires 26a and 26b by resistance welding or other attachment method. As a result, the completed, single flat plane wire mat or blank 39 of FIG. 3b is formed. The leading and trailing end floor wires 34 and 36 and the side wall trailing end support wires 38a and 38b are also preferably constructed from steel or another metal or material known in the art.

Moving from the intermediate stage of cart basket manufacture into what will be called a second intermediate stage of cart basket manufacture, the basket side walls 30a and 30b are then folded upwards into the positions shown in FIG. 4 so that the transverse wires 20 form generally ninety degree angles between the basket floor 24 and the basket side walls 30a and 30b.

Figure 5:
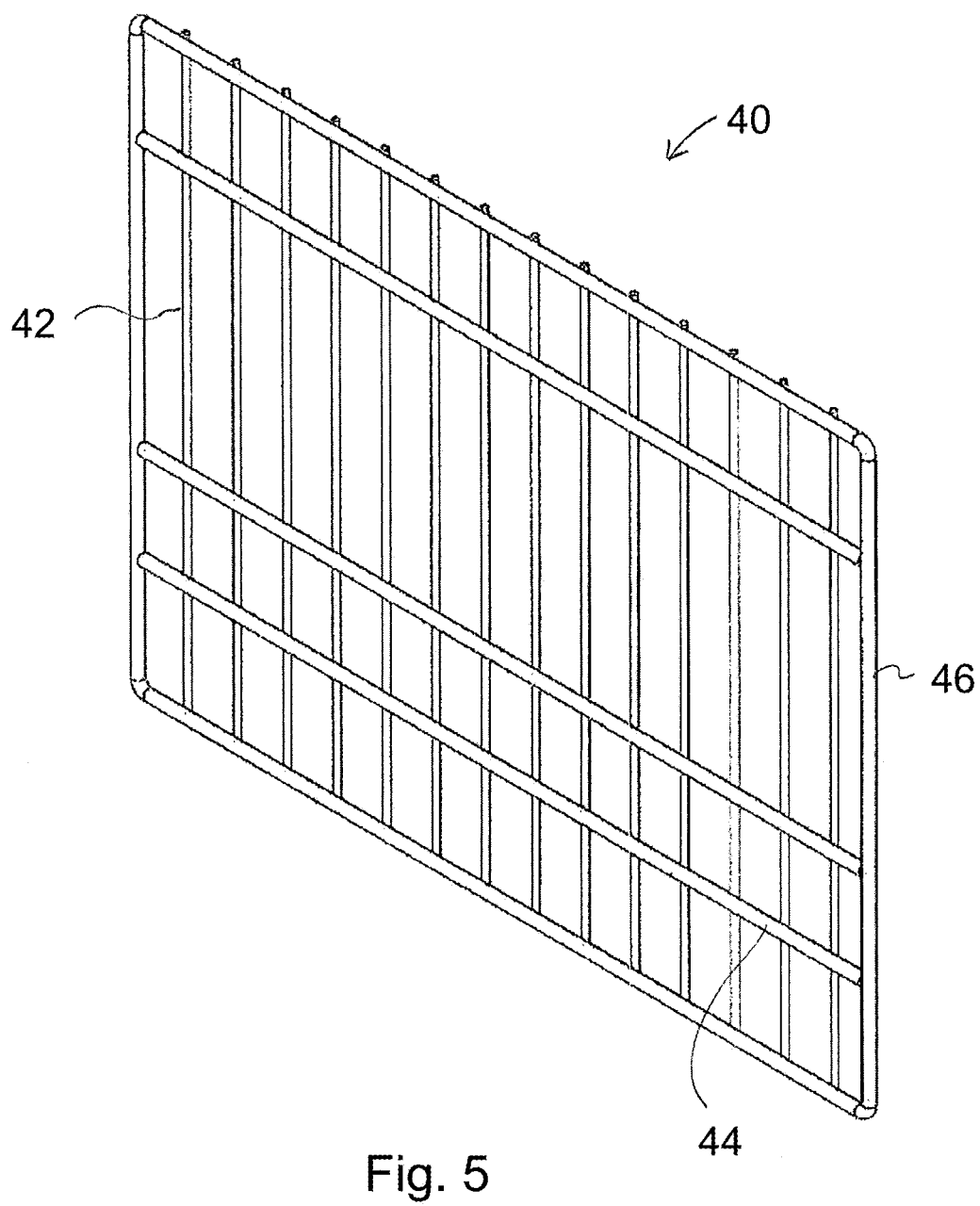
FIG. 5 is a perspective view of a nose panel formed during manufacture of an embodiment of the shopping cart basket of the present invention in accordance with an embodiment of the manufacturing method of the present invention.

Returning to an earlier stage, or perhaps a next stage, a nose panel, indicated in general at 40 in FIG. 5, is formed by resistance welding steel vertical and horizontal wires 42 and 44, respectively, together. The horizontal wires 44 provide structural support and therefore preferably have larger diameters than the vertical wires 42. In addition, the panel is surrounded on all four sides by a frame 46 which may be formed from one or more steel wires having a diameter (or diameters) the same as or equal to the diameters of the horizontal wires 44. The frame 46 may also be attached by resistance welding. Alternative materials and joining methods known in the art may be used in constructing the nose panel 40.

Figure 6:
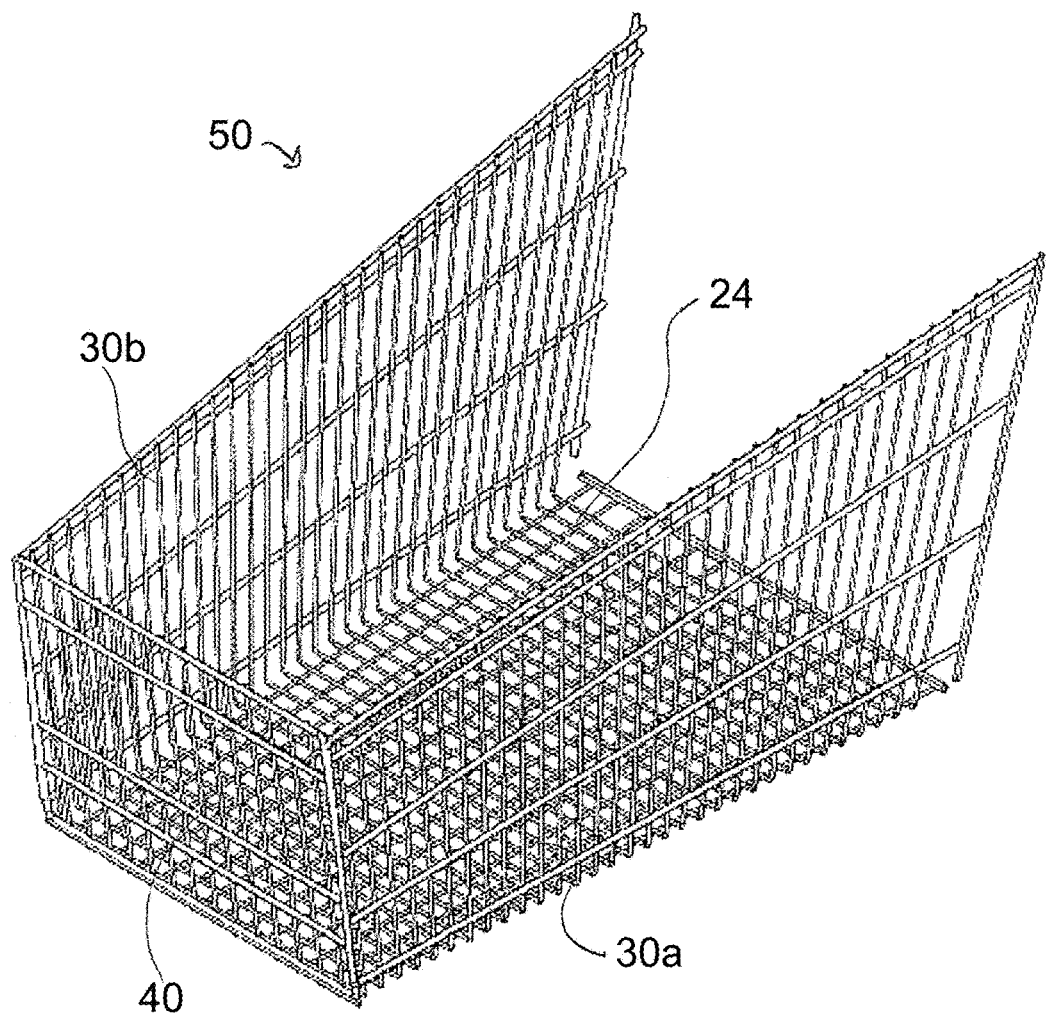
FIG. 6 is a perspective view of a shopping cart basket formed by joining the nose panel of FIG. 5 to the formed wire mat of FIG. 4.
Figure 7:
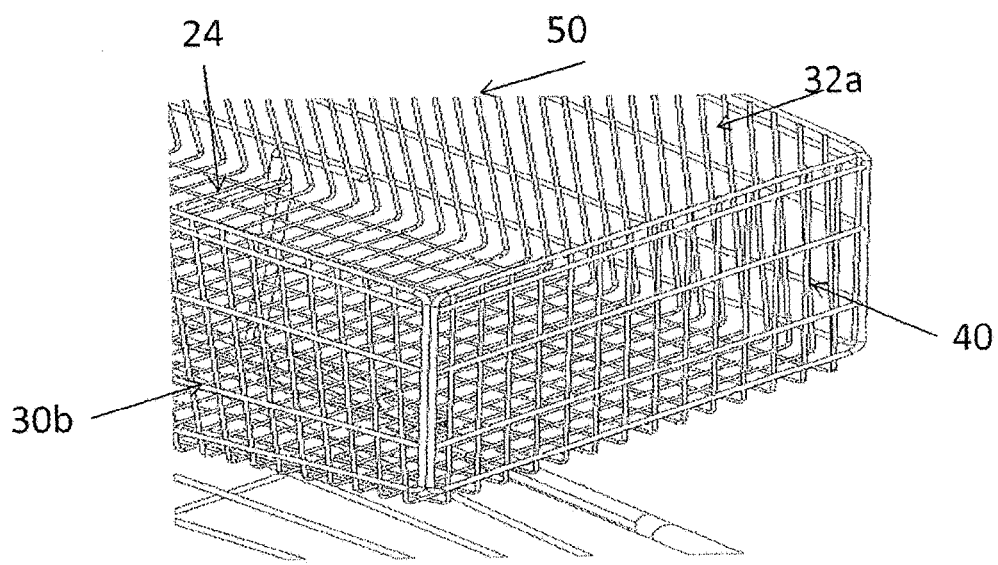
FIG. 7 is a perspective view of the nose portion of the shopping cart basket of FIG. 6.

As illustrated in FIGS. 6 and 7, in the so-called second intermediate stage of manufacture, the nose panel 40 is attached to the leading edges of the floor 24 and side walls 30a and 30b, preferably by mig welding, to form the cart basket, indicated in general at 50. More specifically, the vertical and bottom portions of the frame 46 (FIG. 5) of the nose panel are mig welded to the side wall leading end support wires 28a and 28b (FIGS. 3a, 3b and 4) and the leading end floor wire 34 (FIG. 4). Alternative attachment arrangements known in the art may be used.

Figure 8:
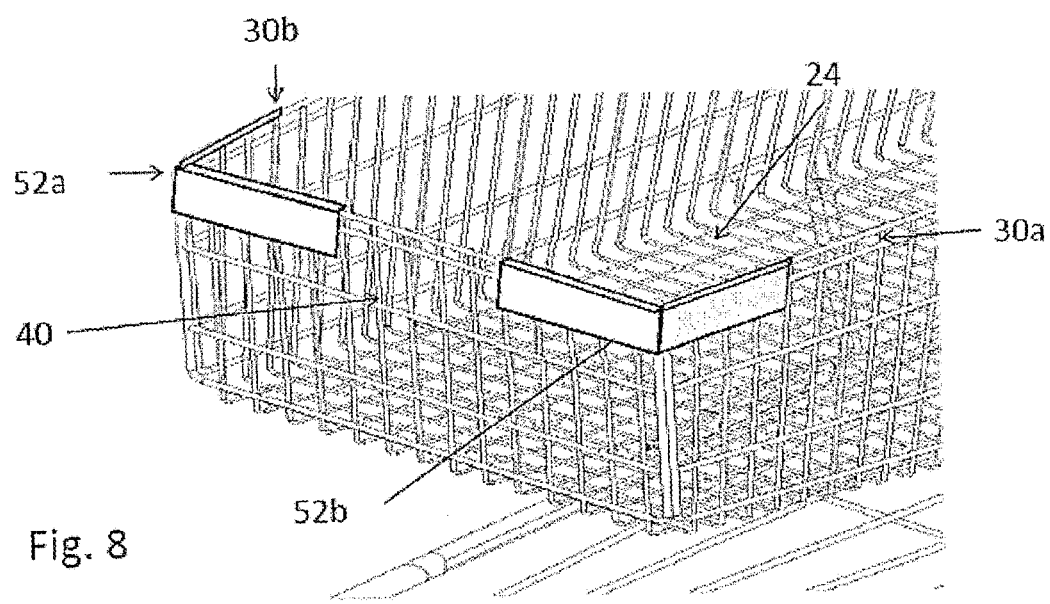
FIG. 8 is an enlarged, partial perspective view of a corner of the nose portion of the basket of FIGS. 6 and 7 with guards attached.

Additional steps of manufacture occur. The basket 50 of FIGS. 6-8 is mounted onto the frame of a cart, as illustrated in FIG. 9. The basket and frame may be powder coated. With reference to FIG. 8, rubber or plastic guards 52a and 52b, which are generally L-shaped, may be placed over the top ends of the corners formed by the side edges of the nose panel 40 and the leading ends of the side walls 30a and 30b to serve as bumpers for the basket.

Again returning to an earlier stage, the cart, indicated in general at 56, features a frame formed from steel tubing that includes a chassis portion 58, to which casters 62 are mounted, and a handle portion 64. In the final stages of manufacture, the trailing edges of the basket side walls 30a and 30b may be welded or otherwise secured to the handle portion 64 of the cart frame. In addition, a basket support 66 is secured between the frame chassis portion 58 and the basket floor 24. A swinging real wall or gate 68 is provided with a collapsible child seat 72, and is also attached to the handle portion 64 of the cart frame. The basket may be mounted to alternative carts and cart frame designs.

A reduction in labor and tooling can be realized with the cart basket 50 of the first embodiment with a variety of choices for the location of cart basket 50 manufacture. Individual wires are generally not individually formed into the final shapes they take in the basket 50. Instead, they are group-formed into their final shapes. Moreover, the wires are not group-formed in dangling conditions. For example, transverse wires 20 are group-formed to have the angles between the basket floor 24 and the basket side walls 30a, 30b. The transverse wires 20 are group-formed while they are already joined by their crisscrossing wires such as the wires 26a, b, c, d.

Furthermore, outsourcing the basket described above is attractive in a new way unlike the past as a matter of kind, not degree, due to the number of units that may be shipped per container. For example, with reference to FIG. 10, the mat 39 of FIG. 3b and the nose panel 40 of FIG. 5, may be loaded into a cargo container or trailer 74 and efficiently stacked since they are generally flat. As a result, and for example, a 40 ft. container or trailer can fit 2300 baskets (via disassembled flat mats 39 and nose panels 40) where the same container or trailer could only carry approximately 900 prior art baskets. The number of 2300 versus 900 is such as change as to be a matter of kind not degree.

In addition, the cart basket design described above lends itself well to automated welding, bending and other manufacturing processes. For example, if manufacture of the above basket design is automated in house or outsourced, it potentially eliminates great numbers of machines, such as potentially more than fifty pieces of equipment such as presses, resistance welders, pneumatic benders, and forming dies.

Still, another preferred embodiment of the subject disclosure in FIG. 1 is a unit 100, also one of many features and advantages. As in FIGS. 1 and 12-16, for example, a cart frame 120 has an essentially one tube or uniframe construction. A basket 140 also has an essentially one unit or unimat construction, from a full, flat blank 142, as in FIG. 12. The unit 100 has fewer wear areas, for longer, better life of all surfaces. The nesting length (arrow 141) between multiple units 100—and units 100 with pre-existing units such as 70—is minimal. Space occupation by multiple units is also thereby minimal. Packing is maximized. Transportation expense is also minimized. The same is true for on-site storage conditions. Many more units fit less space. New positions of nest bars, frame-to-basket contact, and new slim-line upright frame bars provide the benefits, in major parts. The units maintain nestability with past constructions of carts, such as those in FIG. 11. Upright, reinforced protection corners 134 at the front corners of the basket, after assembly, protect against front corner damage with unique capabilities.

Referring first to frame 120, since the frame of the first embodiment was not emphasized, the frame 120 of the second embodiment of invention begins manufacture as a single, straight frame tube (straight tube not shown). As in FIG. 14, pairs of mirroring bends 121a, 121b, 122a, 122b, 123a, 123b and 124a, 124b bend the otherwise straight tube into a handle support 125, mirroring, upright, basket connectors 126a, 126b, mirroring arching doglegs 127a, 127b, mirroring horizontal upward and downward base rails 128a, 128b, and mirroring, horizontal, front bumper sections 129a, 129b. The bends 121a-124b, have radii as shown and consistent with varying between the horizontal, the vertical, the lateral and the longitudinal.

A flash weld at the tube ends 130a, 130b forms on a front bumper 129 of the two bumper sections 129a, 129b, closes the tube ends upon each other, and seals and gives final shape to the frame tube. Thus, the frame 120 occupies generally two flat planes, a first, vertical plane in the area of the handle support 125 and basket connectors 126a, 126b, and a second, horizontal plane in the area of the base rails 128a, 128b and the front bumper 129. The frame 120 further occupies a third, non-flat plane in the area of the doglegs 127a, 127b. The third plane extends flatly laterally, and yet arches longitudinally to the same extent as the arch of the doglegs. The doglegs arch longitudinally forward from rearward outer extremities through a forward central arch or curve. The arches or curves of the doglegs form stiffness and springs in the frame as against forces that would otherwise bend the frames' flat planes toward each other around bends 123a, 123b. The arches also lower, open, rearward facing dogleg gaps immediately adjacent the doglegs 127a, 127b, below the basket connectors 126a, 126b, and above the lower, extreme rearward extremities of the doglegs 127a, 127b, and the bends 123a, 123b. Horns 130a, 130b, as in FIG. 15, extend downward and rearward from the bends 123a, 123b to support longitudinal aligned wheels 82a, 82b. Other wheels 83a, 83b on swivels are at the front of the frame.

Figure 12:
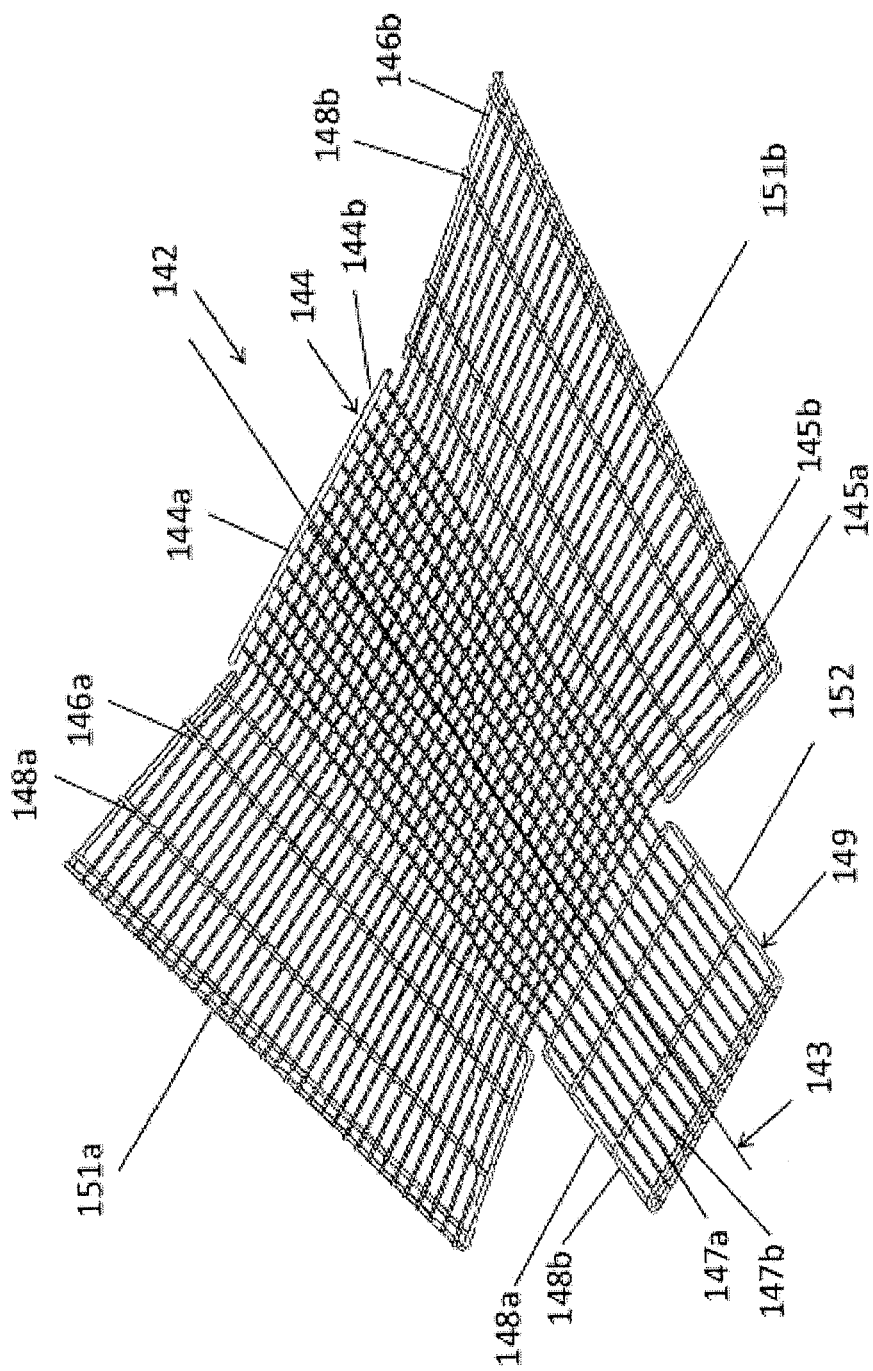
FIG. 12 is a perspective view of a second wire mat or blank formed during manufacture of a second embodiment of the invention.

The basket 140 begins manufacture as a group of wires, as in FIG. 12, and as with the first embodiment. In an early stage of the assembly process, the group is formed into the full blank 142. Thus, at an intermediate stage of construction, the basket 140 occupies the more or less flat plane of the blank 142. The blank 142 has a central base or body 144 of two base sections 144a, 144b that mirror each other on the two sides of the longitudinal centerline 143 of the blank 142. Multiple laterally extending wires, e.g., 145a, 145b, of the central base or body 144 extend laterally outward past the outer extremities of the central base or body 144. These unifying wires extend on each side into mirroring wings 146a, 146b of the blank 142 laterally opposite each other across the central base or body 144. Multiple longitudinally extending wires, e.g., 147a, 147b, of the central base or body 144 extend longitudinally outward past the outer extremities of the central base or body 144 on a forward end of the central base or body 144. These wires extend into a face or head 149 of the blank 142. Mirroring longitudinally extending wing edge wires 148a, 148b extend through the wings 146a, 146b. Mirroring and U-shaped wing perimeter wires 151a, 151b extend along the laterally outermost extent of the wings, bend at an approximately right angle, extend along the front outermost extent of the wings, bend again at about a right angle, and extend along the laterally innermost extent of the wings. A rounded rectangular head perimeter wire 152 extends longitudinally along a laterally outermost extent of the head 149, bends at about a right angle, extends laterally along a longitudinally innermost extent of the head, bends, extends longitudinally along the opposite laterally outermost extent of the head, bends, extends laterally along the longitudinally outermost extent of the head, and bends to return, to complete a rounded rectangle. The number of wires may be adjusted based on such factors as the diameter and materials chosen for the wires. As most preferred and shown, the central base or body has about fourteen longitudinal wires and thirty four transverse wires. The wings have the same thirty-four transverse wires as the central base, their perimeter wires, and three longitudinal wires. One longitudinal wire is closely adjacent the outermost longitudinal extent of the perimeter wire. Two are spaced in the bodies of the wings. The head has its perimeter wire, the same fourteen longitudinal wires as the central base, and three transverse wires. The three transverse wires are spaced to match the three longitudinal wires of the wings. Certain of the wires such as those at the limit of the rear longitudinal extent of the blank may also be of larger diameter, as shown, in all of the central base and two wings.

Referring to FIG. 13, the basket 140 in the frame-mounted form exists as a load-supporting bottom 153, two mirroring, upright, longitudinally extending, lateral sides 154a, 154b, and an upright, lateral extending front 155. It also exists as the reconfiguration of the blank 142, with bends 156a, 156b, 157 and multiple fastenings, e.g. 158a, 158b, added. Bends 156a, 156b are mirroring longitudinal bends which each interpose the basket bottom 153, and one of the two basket sides 154a, 154b. Bend 157 is a lateral bend which interposes the basket bottom 153 and the basket front 155. All bends 156a, 156b and 157 are approximately right angle bends, which bring the outer extremities of the basket sides 154a, 154b and the basket front 154 into the formation of a plane of an upward facing opening 159 of the basket 140 that more or less parallels the flat plane of the basket bottom 153. The opening also has the same trapezoidal shape as the basket bottom 153.

As seen by referring to both FIG. 13 and FIG. 12, the frame-mounted form of the basket 140 brings into close and generally parallel relationship, from the mat form of the basket, the longitudinally forward-most extents 159a, 159b of the wing perimeter wires 151a, 151b and the laterally outermost extents 160a, 160b of the head perimeter wire 152. The adjacent, upright pairs of wires 159a, 160a, and 159b, 160b, located at the front corners 161 of the frame-mounted form of the basket 140 are fastened as by welding to each other. The corners 161 thus enjoy the reinforcement of the pairs of adjacent wires and their fastenings such as welds.

Figure 15:
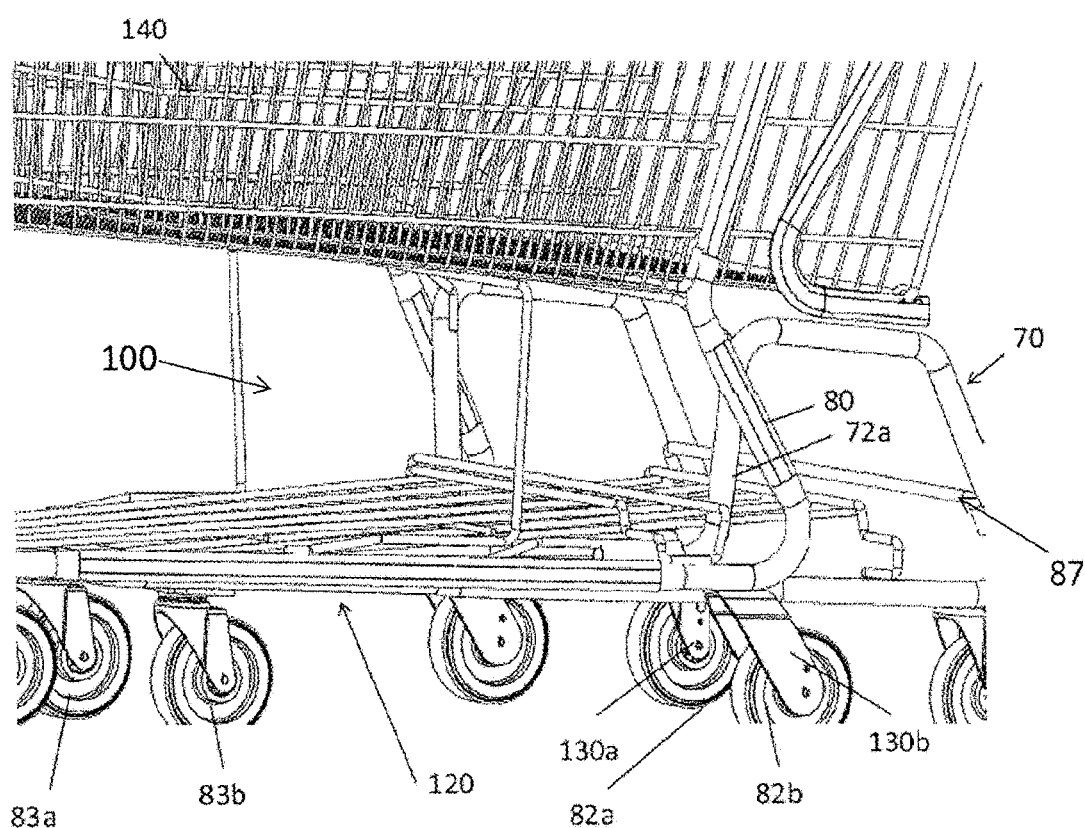
FIG. 15 is a perspective view of an embodiment of invention nesting with an earlier form of cart as in FIG. 11.

Referring to FIG. 15, a shopping cart 100 comprises a basket 140 and a frame 120. The frame supports the basket, and comprises a chassis and handle. The frame chassis comprises base rails and a front bumper. The handle comprises a handle support, upright basket connectors, and doglegs. The doglegs include a wall section 80. This section 80 has a hollow configuration, defining an elongate transverse cross-section, which has a longer dimension and a shorter dimension. The doglegs, here as elsewhere, extend upright from the base rails and below the basket connectors. As shown, the shopping cart 100 nests with a pre-existing alternate shopping cart 70. It nests more closely with cart 70 than multiple carts 70 nest with themselves. As in FIG. 11, the pre-existing alternate shopping cart 70 includes an alternate frame with upright forward and rearward side rails. The identified wall sections 80 of the doglegs of the shopping cart 100 nest outside and adjacent the upright forward side rails such as side rail 72a of the alternate frame of the pre-existing alternate shopping cart 70. The wall sections 80, as seen in FIG. 15, extend both forward and rearward of the upright forward side rails 72a of the alternate frame of the pre-existing alternate shopping cart 70, when the wall sections 80 nest outside and adjacent the upright forward side rails 72a.

Figure 16:
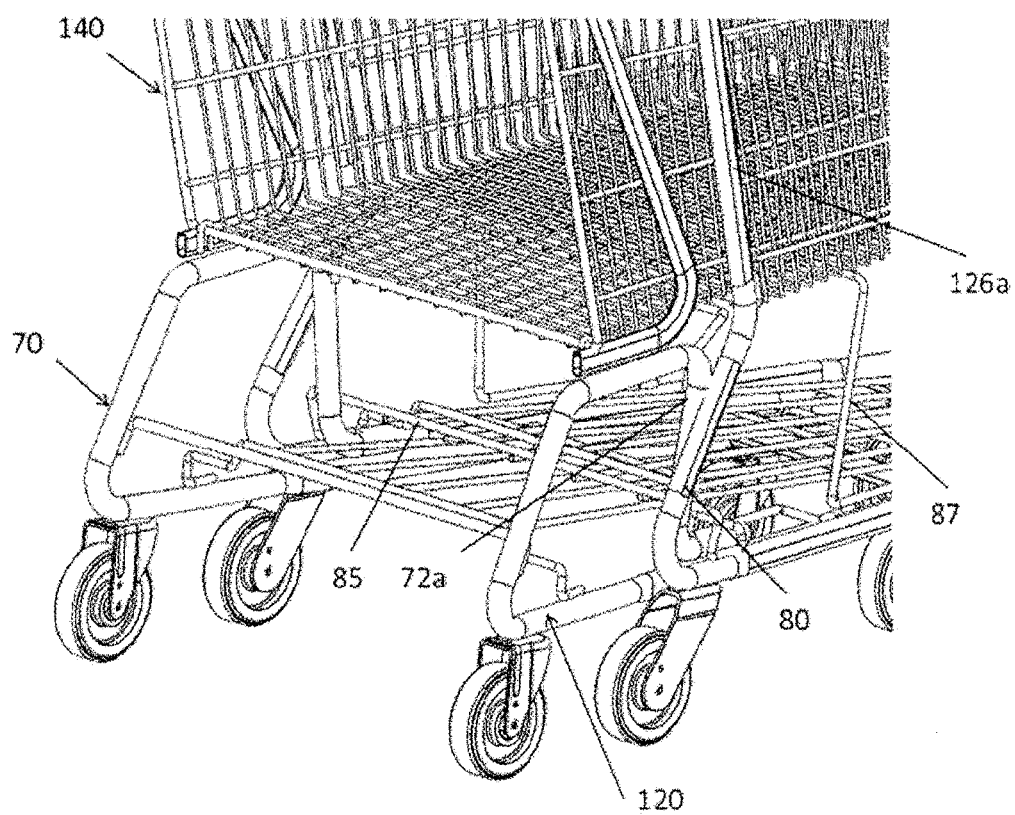
FIG. 16 is another perspective of an embodiment of invention nesting with an earlier form of cart, in addition to FIG. 15.

Referring to FIG. 16, the cart 100 further includes a nest stop wire 85. As most preferred, the forward-to-rearward nesting position of the cart 100 is determined by contact of the next stop wire 85 with another cart, either another cart 100 or another pre-existing cart 70. In the case of the cart 70, as shown, the nest stop wire establishes the forward-to-rearward nesting position by contact against the forward side rails such as side rail 72a of the cart 70. The nest stop wire 85, unlike the stop wire on the rear side rails of the alternate form of the cart 70, is along the frame base rails 128a, 128b of the cart 100 well forward of the doglegs 127a, 127b. For nesting of cart 100 with another cart 100, the nest stop wire 85 contacts a basket support wire 87.

All other surfaces of the frame 120 and remainder of the cart 100 can and as intended, do, remain without front-to-rear contact during nesting. Vertical, sliding contact between carts 100, and carts 100, 70, is desired, as the cart 100 includes a cart lift such as the lift disclosed in U.S. patent application Ser. No. 14/098,744 (see above). By sliding contact of frames, the lift raises the rear wheels of a cart 100 or 70 nested on a cart 100. As an aspect of tight nesting, not only the wall section 80 have longer and shorter transverse cross-sections. As in FIG. 16, at least sections if not all of the frame basket connectors 126a, 126b (b not seen in FIG. 16) have longer and shorter cross-sections. The horizontal longitudinal wires of the basket 140 are also aligned within the limits of the outer-side-to-inner-side extent of the transverse widths of the connectors 126a, 126b. The "slim-profiling" of the basket 140 and connectors 126a, 126b, contributes to the lack of front-to-rear contact of the cart 100 with another cart 100 or 70 during nesting, apart from the contact of nest stop wire 85.

The preferred embodiments of invention provide distinct structuring of carts. The frame 120 of the one embodiment constitutes a uniframe, in having multiple segments including its handle support 125, basket connectors 126, and base rails 128 formed of a single tubular member, or its basket connectors 126 and doglegs 127 the same. The baskets of the embodiments constitute mat baskets, in existing in the mat-form of a substantially flat mat of multiple portions including a central body and wings that make up the basket floor and sides in the frame-mounted form of the basket. The frame and basket of at least one embodiment together constitute a slim-fit cart frame and basket, in providing fit into other carts during nesting with only forward-to-back contact between the nest stop wire 85 and an associated wire or frame member.

Shopping Cart Bumper

Figure 17:
FIG. 17 is a perspective view of a shopping cart including bumpers according to aspects of this disclosure.
Figure 18:
FIG. 18 is a side view of a shopping cart including bumpers according to aspects of this disclosure.

Referring now to FIGS. 17-27, shopping carts 100, including those described above, may include bumpers 300. Bumpers 300 may be used to protect the cart and/or items that the cart may contact during operation. As shown in FIG. 17, the bumpers 300 may be designed to fit over one or both of the front corners of the shopping cart 100.

Figure 19:
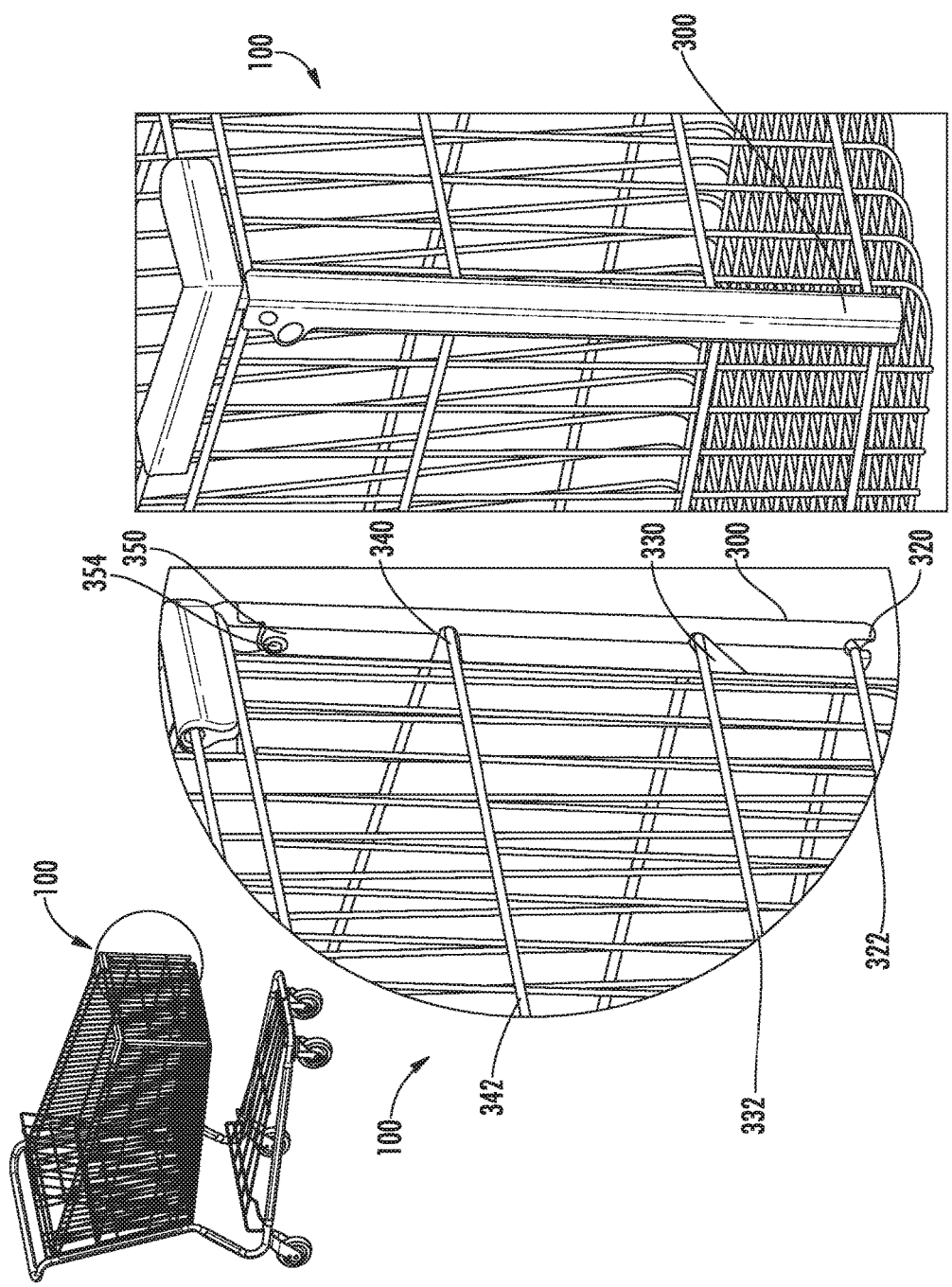
FIG. 19 includes detailed perspective views of a shopping cart including bumpers according to aspects of this disclosure.

Referring now primarily to FIGS. 19-20, the bumper may have a generally U-shaped cross-sectional shape (as best shown in FIG. 20A). The bumper 300 may include an inner leg 302 and an outer leg 304 connected in a center section 306. The bumper may have an inner surface 301 and an outer surface 303. The bumper 300 may also include a top end 308 and a bottom end 310 and an inner edge 305 and an outer edge 306. As shown in, for example in FIGS. 17, 19, and 20, the bumper 300 may include one or more slots 320, 330, 340 which may be used to engage the shopping cart 100. These slots may be primarily located on the inner leg 302 of the bumper 300 which may allow the inner leg of the bumper to engage wires of the shopping cart 100.

Figure 22:
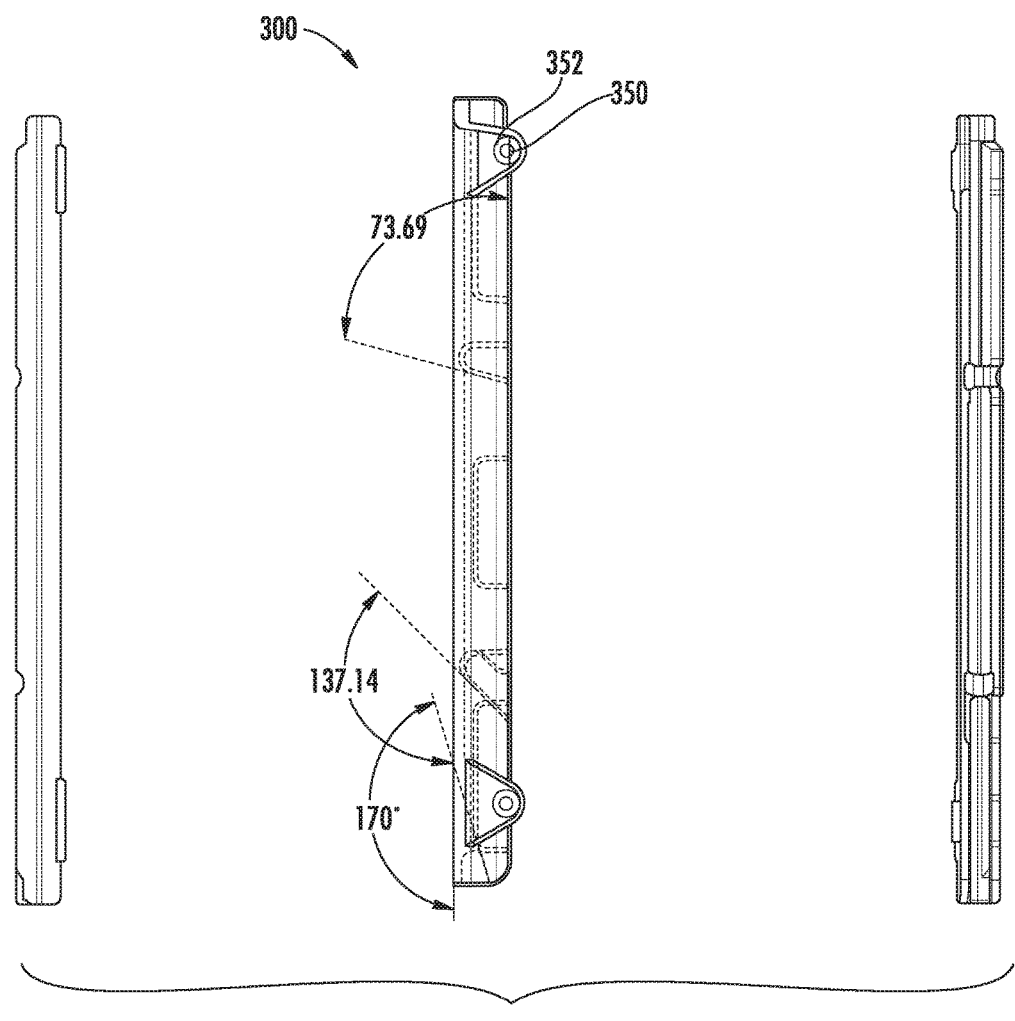
FIG. 22 includes views of a shopping cart bumper according to aspects of this disclosure.
Figure 23:
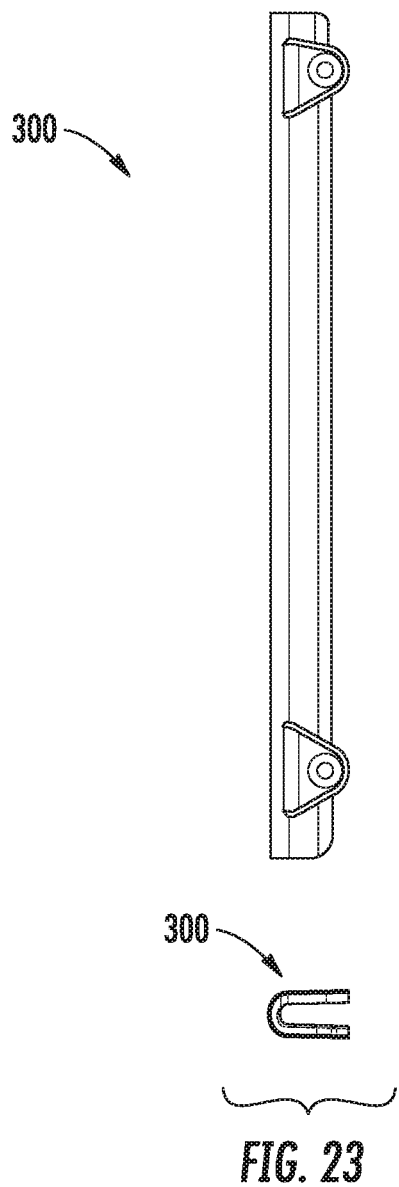
FIG. 23 includes views of a shopping cart bumper according to aspects of this disclosure.
Figure 24:
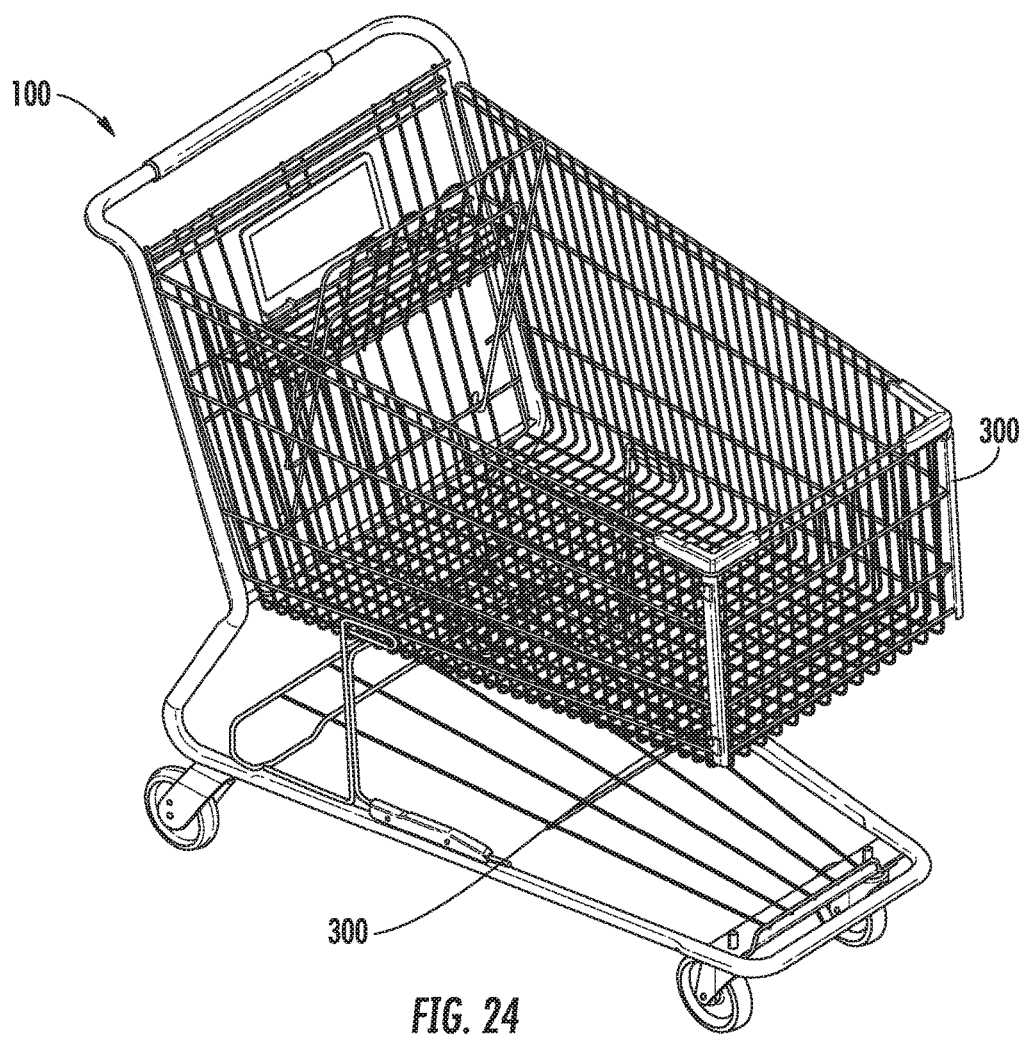
FIG. 24 is a perspective view of a shopping cart including bumpers according to aspects of this disclosure.
Figure 25:
FIG. 25 is a side view of a shopping cart including bumpers according to aspects of this disclosure.
Figure 26:
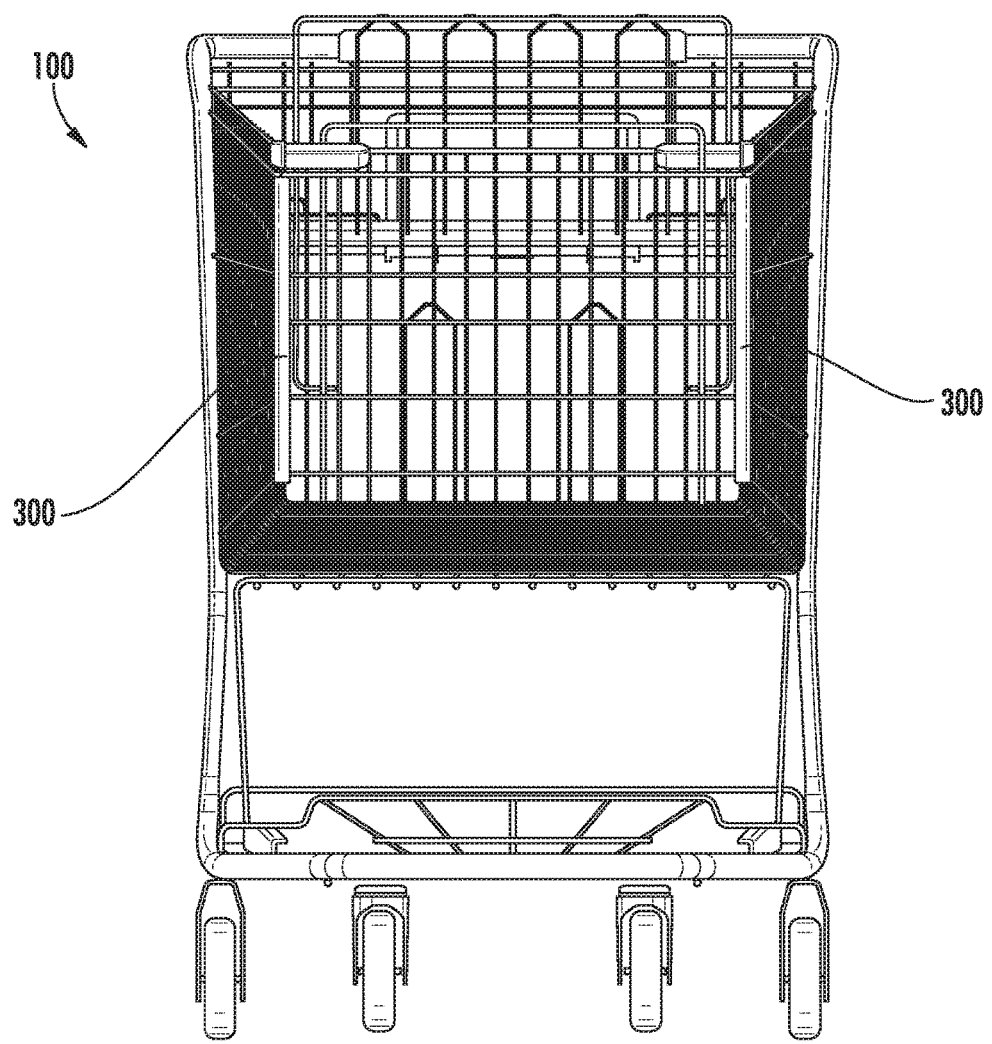
FIG. 26 is a back view of a shopping cart including bumpers according to aspects of this disclosure.
Figure 27:
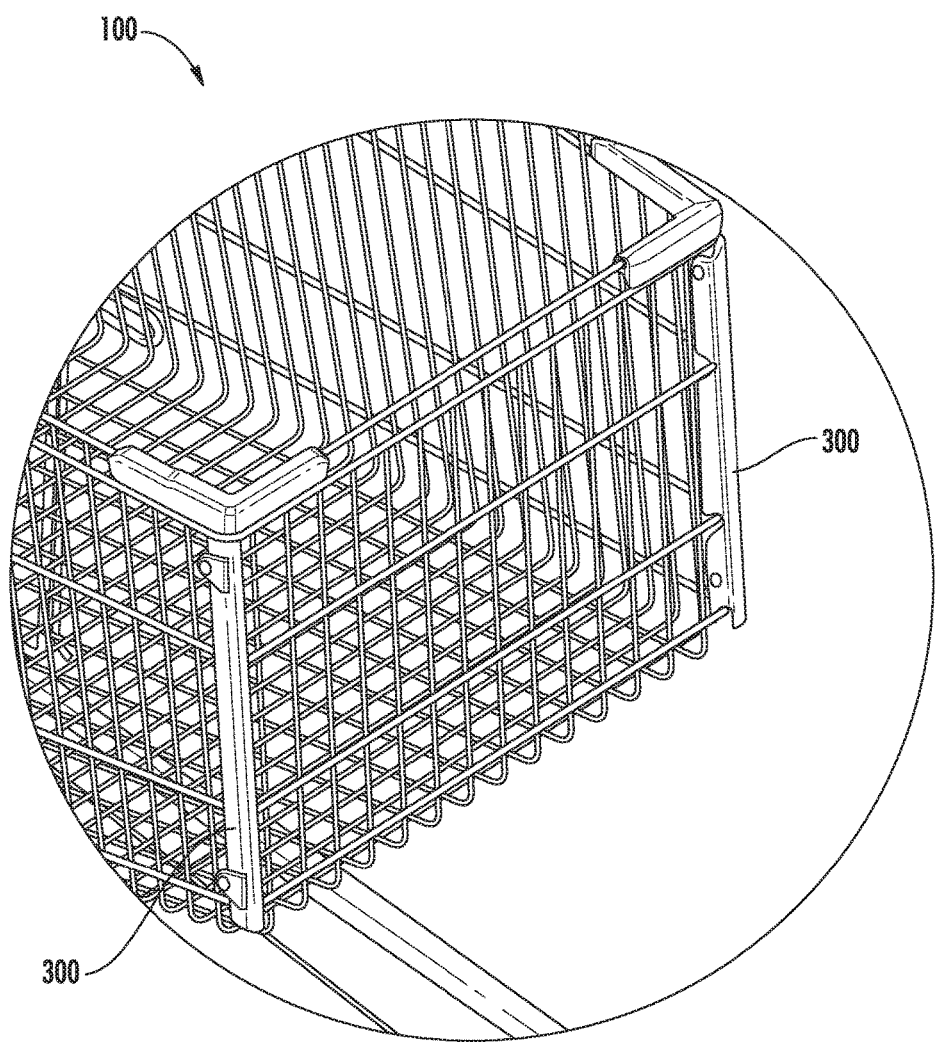
FIG. 27 is a detailed perspective view of a shopping cart including bumpers according to aspects of this disclosure.

As shown primarily in FIGS. 19 and 20D, the bumper 300 may include a first slot 320 in the bottom end 310 of the inside leg 302. The first slot 320 may be oriented substantially vertically. As shown in FIG. 19, the first slot 320 may engage a wire 322 of the shopping cart 100. As shown in FIG. 20D, the first slot 320 may have a forward edge 326 and a back edge 328. The edges 326, 328 may be angled with respect to the bottom edge of the inside leg 302 or may be vertical. For example, the back edge 338 may be oriented at about 170 degrees or between about 155 degrees and 180 degrees from the edge of the bumper (between about 0 degrees and 25 degrees from the forward edge 326) and as best shown in FIG. 22.

The bumper 300 may also include a second slot 330 in the inside leg 302 of the bumper 300. The second slot 330 may engage a wire 332 of the shopping cart. As shown in FIG. 20D, the second slot 330 may have a lower edge 336 and an upper edge 338. Each edge may be angled with respect to the outer edge of the inside leg 302. In some embodiments, edges 336, 338 may be substantially parallel with each other. The edges 336, 338 may be oriented at about 137.14 degrees or between about 125 degrees and 150 degrees from the edge of the bumper (also between about 125 degrees and 150 degrees from the inner edge 305) and as best shown in FIG. 22.

The bumper 300 may also include a third slot 340 in the inside leg 302 of the bumper 300. The third slot 340 may engage a wire 342 of the shopping cart. As shown in FIG. 20D, the third slot 340 may have a lower edge 346 and an upper edge 348. As shown in FIG. 20D, the lower edge 346 may be angled with respect to the outer edge of the inside leg 302. The upper edge 348 may be substantially horizontal or perpendicular to the outer edge of the inside leg 302. The lower edge 346 may be oriented at about 73.69 degrees or between about 60 degrees and 90 degrees from the edge of the bumper (between about 0 degrees and 30 degrees from the upper edge 348) and as best shown in FIG. 22.

Additionally, the bumper 300 may include one or more fastening systems 350. As shown in FIGS. 17-20 the bumper may include a single fastening system 350, and as shown in FIGS. 21-27 the bumper 300 may include multiple fastening systems 350. The fastening system 350 may include an aperture 352 formed through both the inner and outer leg 302, 304. A mechanical fastener 354 such as a rivet, screw, bolt, or other suitable device may then pass through the aperture 352 to engage the bumper 300 with the shopping cart 100.

The bumper 300 may be formed using many known methods and materials. For example, the bumper may be formed using injection molding or other suitable methods and may be formed of plastics, HDP, Nylon, polyurethane, rubber or other suitable materials.

To assemble the bumper 300 to a shopping cart 100, a user may first engage the first slot 320 with the shopping cart wire 322. The user may then rotate bumper 300 in an upward direction to engage the second slot 330 and the third slot 340 with shopping cart wires 332 and 342 respectively. Once the bumper 300 has been rotated into place, the user may then engage the mechanical fastener(s) 354 through the aperture(s) 352 to lock the bumper 300 to the shopping cart 100. Advantageously, the disclosed bumpers 300 may provide increased efficiency of assembly of a bumper 300 to a shopping cart 100.

The bumper 300 may include a number of additional features. For example, in some embodiments, and as shown in FIGS. 20 and 21, the top end 308 of the inside leg 302 may not extend as high as the top end 308 of the outside leg 304. This may advantageously allow the bumper 300 to engage the wires of the shopping cart 100 while providing maximum bumper coverage on the outside edge of the cart. Additionally, one or more portions 360 of the bumper 300 may be thinner than other portions. This may advantageously allow for the bumper to fit over portions of the shopping cart which may be larger than other portions. For example, portions of the shopping cart which are welded together, as described above, may be enlarged compared to portions which are not welded together.

While the preferred embodiments of the invention have been shown and described, it will be apparent to those skilled in the art that changes and modifications may be made therein without departing from the spirit of the invention.

The invention claimed is:

1. A bumper for a front corner of a wire-made shopping cart having horizontal wires, the bumper comprising:
    an inner leg, an outer leg, an elongated center section, and one or more apertures passing through the inner leg and the outer leg such that a mechanical fastener may pass through the one or more apertures to lock the bumper to the shopping cart, wherein the inner leg and outer leg are connected at the center section such that the bumper has a generally u-shaped cross-section, and wherein the inner leg comprises a plurality of slots for engaging horizontal wires of the wire-made shopping cart.

2. The bumper of claim 1, further comprising a top end and a bottom end, wherein the plurality of slots includes a first slot located in the bottom end of the bumper, the first slot having a forward edge and a back edge wherein the forward edge is substantially vertical and the back edge is oriented 0 degrees to 25 degrees from the forward edge.

3. The bumper of claim 1, wherein the bumper further comprises a top end and a bottom end and the inner leg defines an inner edge, and wherein the plurality of slots includes a second slot, the second slot being located nearer to the bottom end than to the top end and having a lower edge and an upper edge, wherein the lower edge and upper edge are substantially parallel to each other and are oriented 125 degrees to 150 degrees from the inside edge.

4. The bumper of claim 1, further comprising a top end and a bottom end, wherein the plurality of slots includes a third slot, the third slot being located nearer to the top end than to the bottom end and having a lower edge and an upper edge, wherein the upper edge is substantially horizontal, and the lower edge is oriented 0 degrees to 30 degrees from the upper edge.

5. The bumper of claim 1, further comprising a top end and a bottom end and a first aperture located nearer to the top end than to the bottom end.

6. A bumper for a front corner of a wire-made shopping cart, the bumper comprising:
    a top end;
    a bottom end;
    an inner leg defining an inner edge, the inner leg further comprising:
        a first slot located in the bottom end of the bumper and having a forward edge and a back edge wherein the forward edge is substantially vertical and the back edge is oriented 0 to 25 degrees from the forward edge;
        a second slot located above the first slot and nearer to the bottom end than to the top end and having an upper edge and a lower edge, the lower edge and upper edge being substantially parallel to each other and being oriented 125 to 150 degrees from the inner edge; and
        a third slot located above the second slot and nearer to the top end than to the bottom end and having an upper edge and a lower edge, the upper edge being substantially horizontal and the lower edge being oriented 0 to 30 degrees from the upper edge;
    an outer leg; and
    an elongated center section connecting the inner leg and the outer leg such that the bumper has a generally u-shaped cross-section.

7. The bumper of claim 6, further comprising an aperture that passes through the inner leg and the outer leg nearer to the top end than to the bottom end.

8. A method for assembling a bumper to a front corner of a wire-made shopping cart having horizontal wires, the method comprising:
    engaging the bumper with the horizontal wires of the shopping cart, wherein the bumper comprises an inner leg, an outer leg, and an elongated center section, and wherein the inner leg and outer leg are connected at the center section such that the bumper has a generally u-shaped cross-section, the bumper further comprising a top end and a bottom end and an aperture that passes through the inner leg and the outer leg nearer to the top end than to the bottom end, and wherein the inner leg comprises a plurality of slots for engaging the horizontal wires; and
    passing a mechanical fastener through the aperture to lock the bumper to the shopping cart.

9. The method of claim 8, wherein the inner leg defines an inner edge and wherein the plurality of slots comprises a first slot, a second slot, and a third slot, the first slot being located in the bottom end of the bumper and having a forward edge and a back edge wherein the forward edge is substantially vertical and the back edge is oriented 0 to 25 degrees from the forward edge, the second slot being located above the first slot and nearer to the bottom end than to the top end and having an upper edge and a lower edge, the lower edge and upper edge being substantially parallel to each other and being oriented 125 to 150 degrees from the inner edge, and the third slot being located above the second slot and nearer to the top end than to the bottom end and having an upper edge and a lower edge, the upper edge being substantially horizontal and the lower edge being oriented 0 to 30 degrees from the upper edge, the method further comprising:
    engaging the first slot with a horizontal wire of the shopping cart; and
    rotating the bumper in an upward direction to engage the second slot and then the third slot with horizontal wires of the shopping cart.

10. A method for manufacturing a shopping cart, the method comprising:
    receiving a mat having a floor portion and side wall portions, wherein the floor portion is positioned between the side wall portions;
    receiving a nose panel, wherein the nose panel is constructed from a plurality of vertical wires and plurality of horizontal wires;
    receiving two bumpers, wherein the bumpers comprise an inner leg, an outer leg, and an elongated center section, the inner leg and outer leg being connected at the center section such that the bumper has a generally u-shaped cross-section, and wherein the inner leg comprises a plurality of slots for engaging the horizontal wires of the nose panel;
    folding the side wall portions of the mat so that they lay in planes that are generally perpendicular to a plane containing the floor portion;
    attaching the nose panel to the leading edges of the floor portion and the side wall portions, wherein the attachment of the nose panel to the leading edges of the side wall portions defines front corners of the shopping cart;
    engaging the plurality of slots of the bumpers with the horizontal wires of the nose panel such that the bumpers cover the front corners of the shopping cart; and
    wherein the bumpers further comprise a top end and a bottom end and the inner leg of the bumpers defines an inner edge, and wherein the plurality of slots comprises a first slot, a second slot, and a third slot, the first slot being located in the bottom end of the bumper and having a forward edge and a back edge wherein the forward edge is substantially vertical and the back edge is oriented 0 to 25 degrees from the forward edge, the second slot being located above the first slot and nearer to the bottom end than to the top end and having an upper edge and a lower edge, the lower edge and upper edge being substantially parallel to each other and being oriented 125 to 150 degrees from the inner edge, and the third slot being located above the second slot and nearer to the top end than to the bottom end and having an upper edge and a lower edge, the upper edge being substantially horizontal and the lower edge being oriented 0 to 30 degrees from the upper edge, the method further comprising:

engaging the first slot of each bumper with a horizontal wire of the nose panel; and rotating each bumper in an upward direction to engage the second slot and the third slot with horizontal wires of the nose panel.

11. The method of claim 10, wherein the floor portion is formed of a plurality of transverse wires joined to a plurality of longitudinal wires and the side wall portions are formed from the plurality of transverse wires joined to a plurality of side wall structural wires.

12. The method of claim 10, wherein the bumpers further comprise an aperture that passes through the inner leg and the outer leg of the bumper nearer to the top end than to the bottom end, the method further comprising:

passing a mechanical fastener through the aperture to lock the bumper to the shopping cart.

13. A bumper for a front corner of a wire-made shopping cart having horizontal wires, the bumper comprising:

an inner leg,
an outer leg, and
an elongated center section,
wherein the inner leg and outer leg are connected at the center section such that the bumper has a generally u-shaped cross-section, and
wherein the inner leg comprises a plurality of slots for engaging horizontal wires of the wire-made shopping cart, and
wherein the bumper further comprises a top end and a bottom end, wherein the plurality of slots includes a first slot located in the bottom end of the bumper, the first slot having a forward edge and a back edge wherein the forward edge is substantially vertical and the back edge is oriented 0 degrees to 25 degrees from the forward edge.

14. A bumper for a front corner of a wire-made shopping cart having horizontal wires, the bumper comprising:

an inner leg,
an outer leg, and
an elongated center section,
wherein the inner leg and outer leg are connected at the center section such that the bumper has a generally u-shaped cross-section,
wherein the inner leg comprises a plurality of slots for engaging horizontal wires of the wire-made shopping cart, and
wherein the bumper further comprises a top end and a bottom end and the inner leg defines an inner edge, and wherein the plurality of slots includes a second slot, the second slot being located nearer to the bottom end than to the top end and having a lower edge and an upper edge, wherein the lower edge and upper edge are substantially parallel to each other and are oriented 125 degrees to 150 degrees from the inside edge.

\* \* \* \* \*